(12) United States Patent
Ode et al.

(10) Patent No.: US 9,312,928 B2
(45) Date of Patent: Apr. 12, 2016

(54) RADIO COMMUNICATIONS SYSTEM

(75) Inventors: Takayoshi Ode, Kawasaki (JP);
Kazuhisa Obuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 13/161,830

(22) Filed: Jun. 16, 2011

(65) Prior Publication Data

US 2011/0244788 A1    Oct. 6, 2011

Related U.S. Application Data

(63) Continuation of application No. PCT/JP2008/073839, filed on Dec. 26, 2008.

(51) Int. Cl.
*H04B 3/36* (2006.01)
*H04B 7/14* (2006.01)
(Continued)

(52) U.S. Cl.
CPC ............ *H04B 7/022* (2013.01); *H04L 27/2607* (2013.01); *H04L 27/2647* (2013.01); *H04L 2025/03414* (2013.01)

(58) Field of Classification Search
CPC .. H04B 7/026; H04B 7/15521; H04B 7/2681; H04B 7/0413; H04B 7/0617; H04B 7/12; H04B 7/15507; H04B 7/15585; H04B 7/15592; H04B 7/2606; H04B 72/004; H04B 72/005; H04B 7/022; H04B 7/0689; H04B 7/15542; H04B 7/2656; H04B 7/2693; H04B 7/005; H04L 12/18; H04L 12/185; H04L 12/189; H04L 1/0625; H04L 4/17; H04L 4/47; H04L 5/0035; H04L 27/2607; H04L 29/06027; H04L 45/24; H04L 49/201; H04L 65/4076; H04L 67/325; H04L 2001/00; H04L 12/56; H04L 45/00; H04W 48/04; H04W 48/08; H04W 88/04; H04W 36/026; H04W 40/22; H04W 72/0453; H04M 2203/205
USPC ......... 455/7, 11.1, 13.1, 13.2, 13.3, 15, 16, 9, 455/14, 22, 25, 41.1, 67.11, 67.13, 101, 455/404.1, 422.1, 442, 444, 456.3, 507, 455/522; 370/75, 227, 228, 243, 246, 252, 370/274, 278, 279, 280, 293, 312, 315, 328, 370/329, 330, 331, 335, 338, 428, 431, 432, 370/437, 480, 492, 510; 375/130, 135, 211, 375/260, 265, 308, 347; 714/748, 750
See application file for complete search history.

(56) References Cited

U.S. PATENT DOCUMENTS 7,218,891 B2 *  5/2007  Periyalwar ............ H04W 52/46
                                                455/11.1
7,746,822 B2 *  6/2010  Xue et al. ...................... 370/328

(Continued)

FOREIGN PATENT DOCUMENTS

CA    2 624 172     4/2007
CN    101072065    11/2007
(Continued)

OTHER PUBLICATIONS

Notice of Preliminary Rejection issued for corresponding Korean Patent Application No. 10-2011-7014313, mailed Sep. 27, 2012, with English translation.
(Continued)

*Primary Examiner* — Yuwen Pan
*Assistant Examiner* — Paul P Tran
(74) *Attorney, Agent, or Firm* — Myers Wolin, LLC

(57) ABSTRACT

A radio communications system includes a radio base station, an intermediate station to receive data from the radio base station and relay the received data; and another radio base station adjacent to the radio base station. The radio base station transmits data that is the same as the data to be relayed by the intermediate station, in synchronization with the relaying by the intermediate station and by using a radio resource that the intermediate station uses in the relaying of the received data.

14 Claims, 22 Drawing Sheets

(51) Int. Cl.

| | | |
|---|---|---|
| *H04B 7/15* | (2006.01) | |
| *H04B 7/185* | (2006.01) | |
| *H04B 7/00* | (2006.01) | |
| *H04H 20/71* | (2008.01) | |
| *H04W 4/00* | (2009.01) | |
| *G06F 15/16* | (2006.01) | |
| *H04B 7/02* | (2006.01) | |
| *H04L 27/26* | (2006.01) | |
| *H04L 25/03* | (2006.01) | |

(56) References Cited

U.S. PATENT DOCUMENTS

| | | | |
|---|---|---|---|
| 8,068,452 B2* | 11/2011 | Diao | 370/328 |
| 8,125,938 B2* | 2/2012 | Nystrom et al. | 370/315 |
| 8,204,018 B2* | 6/2012 | Chindapol et al. | 370/330 |
| 2002/0037719 A1* | 3/2002 | Ariga et al. | 455/423 |
| 2003/0169716 A1* | 9/2003 | Saito | H04W 36/18 370/338 |
| 2004/0151157 A1* | 8/2004 | Nishimura | H04L 12/189 370/349 |
| 2004/0266339 A1* | 12/2004 | Larsson | 455/7 |
| 2005/0036455 A1 | 2/2005 | Bakker et al. | |
| 2005/0201407 A1 | 9/2005 | Kim et al. | |
| 2006/0256741 A1* | 11/2006 | Nozaki | 370/278 |
| 2007/0064669 A1* | 3/2007 | Classon et al. | 370/347 |
| 2007/0070954 A1 | 3/2007 | Kim et al. | |
| 2007/0086537 A1 | 4/2007 | Yoon et al. | |
| 2007/0147411 A1* | 6/2007 | Bijwaard et al. | 370/432 |
| 2007/0155315 A1* | 7/2007 | Lee et al. | 455/11.1 |
| 2008/0056172 A1 | 3/2008 | Nakatsugawa | |
| 2008/0137585 A1* | 6/2008 | Loyola et al. | 370/315 |
| 2009/0010196 A1* | 1/2009 | Bui et al. | 370/312 |
| 2009/0086666 A1* | 4/2009 | Guvenc et al. | 370/328 |
| 2009/0092073 A1* | 4/2009 | Doppler et al. | 370/315 |
| 2009/0213774 A1 | 8/2009 | Chapman et al. | |
| 2010/0317284 A1* | 12/2010 | Charbit et al. | 455/7 |
| 2011/0032861 A1* | 2/2011 | Gou | 370/312 |
| 2011/0044225 A1* | 2/2011 | Rinne et al. | 370/312 |
| 2013/0128998 A1 | 5/2013 | Tanno et al. | |

FOREIGN PATENT DOCUMENTS

| | | |
|---|---|---|
| CN | 101136681 A | 3/2008 |
| EP | 1850560 | 10/2007 |
| EP | 1890403 A2 | 2/2008 |
| EP | 1924009 A1 | 5/2008 |
| JP | 10-032557 | 2/1998 |
| JP | 2003-69491 | 3/2003 |
| JP | 2003-069491 | 3/2003 |
| JP | 2005-065256 | 3/2005 |
| JP | 2005-535257 | 11/2005 |
| JP | 2007-158662 | 6/2007 |
| JP | 2007-221743 A | 8/2007 |
| JP | 2007-529948 | 10/2007 |
| JP | 2008-503130 | 1/2008 |
| JP | 2009-521823 | 6/2009 |
| JP | 2010-516066 A | 5/2010 |
| KR | 20080056246 | 6/2008 |
| WO | 2004/015876 | 2/2004 |
| WO | 2007/037636 | 4/2007 |
| WO | 2007134486 A1 | 11/2007 |
| WO | 2008057388 A1 | 5/2008 |
| WO | 2008/084634 A1 | 7/2008 |
| WO | 2008/151069 A1 | 12/2008 |
| WO | 2008/155143 A1 | 12/2008 |
| WO | WO 2008155332 A2 * | 12/2008 |

OTHER PUBLICATIONS

International Search Report for corresponding International Patent Application No. PCT/JP2008/073839, mailed Mar. 31, 2009.
Qualcomm Europe; "Comparing Relay Support with MBSFN and Blank Subframes" Agenda Item No. 6; Document for Discussion and Decision; R1-084515; 3GPP TSG RAN WG1 #55 Meeting; Prague, Czech Republic, Nov. 10-14, 2008; [Ref.: ISR mailed Mar. 31, 2009].
3GPP TS 36.211 V8.3.0 (May 2008); 3rd Generation Partnership Project; Technical Specification Group Radio Access Network; Evolved Universal Terrestrial Radio Access (E-UTRA); Physical Channels and Modulation (Release 8); May 2008.
3GPP TS 36.300 V8.5.0 (May 2008); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 8); May 2008.
Office Action issued for corresponding Chinese Patent Application No. 200880132479.7, issued on Jul. 2, 2013, with an English translation.
Office Action issued for Japanese Patent Application No. 2012-242795 issued on Sep. 24, 2013, with partial English translation.
Office Action issued for corresponding Japanese patent application No. 2012-242795, issued Nov. 19, 2013, with partial English translation.
Second Notification of Office Action issued for corresponding Chinese patent application No. 200880132479.7, issued Feb. 25, 2014, with English translation.
Decision of rejection issued for corresponding Japanese Patent Application No. 2012-242795, dated Feb. 25, 2014, with an English translation.
Extended European search report issued for corresponding European application No. 08879198.3, dated Mar. 4, 2014.
Reconsideration Report issued for corresponding Japanese Patent Application No. 2012-242795, dated Jul. 28, 2014, retrieved on Aug. 5, 2014, with partial English translation.

* cited by examiner

RADIO COMMUNICATIONS SYSTEM

This is a continuation of International Application PCT/JP2008/073839, filed on Dec. 26, 2008, now pending, the contents of which are herein wholly incorporated by reference.

FIELD

The embodiments discussed herein relate to radio communications systems which include, for example, a mobile communications system and a wireless local area network (LAN).

BACKGROUND

New high-speed communication services called "Long Term Evolution" (LTE) have been introduced in recent years as a new standard for mobile communication systems such as cellular phone networks. LTE-Advanced system, an enhanced version of LTE, has also been discussed in the 3rd Generation Partnership Project (3GPP).

Further, the International Telecommunication Union Radio Communications Sector (ITU-R) has decided to discuss the LTE-Advanced system as a proposal for IMT-Advanced system which enhances the International Mobile Telecommunication 2000 (IMT-2000).

Typical IMT-2000 systems include wideband code-division multiple access (W-CDMA), cdmaOne, and Worldwide Interoperability for Microwave Access (WiMAX) systems.

The development of LTE-Advanced is based on the LTE system and includes the study of introducing Multimedia Broadcast Multicast Service Single Frequency Network (MBSFN). With this MBSFN, a plurality of base stations transmit the same Multimedia Broadcast Multicast Service (MBMS) data, and the multicast data is wirelessly forwarded by intermediate devices (relay stations). Also investigated are extension of uplink and downlink bandwidths and introduction of multiple-input multiple-output (MIMO) uplink.

SUMMARY

According to an aspect of the invention, a radio communications system includes: a first radio base station; an intermediate station to receive data from the first radio base station and relay the received data; and a second radio base station adjacent to the first radio base station; wherein the second radio base station comprises a transmitter to transmit data that is the same as the data to be relayed by the intermediate station, in synchronization with the relaying by the intermediate station and by using a radio resource that the intermediate station uses in the relaying of the received data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
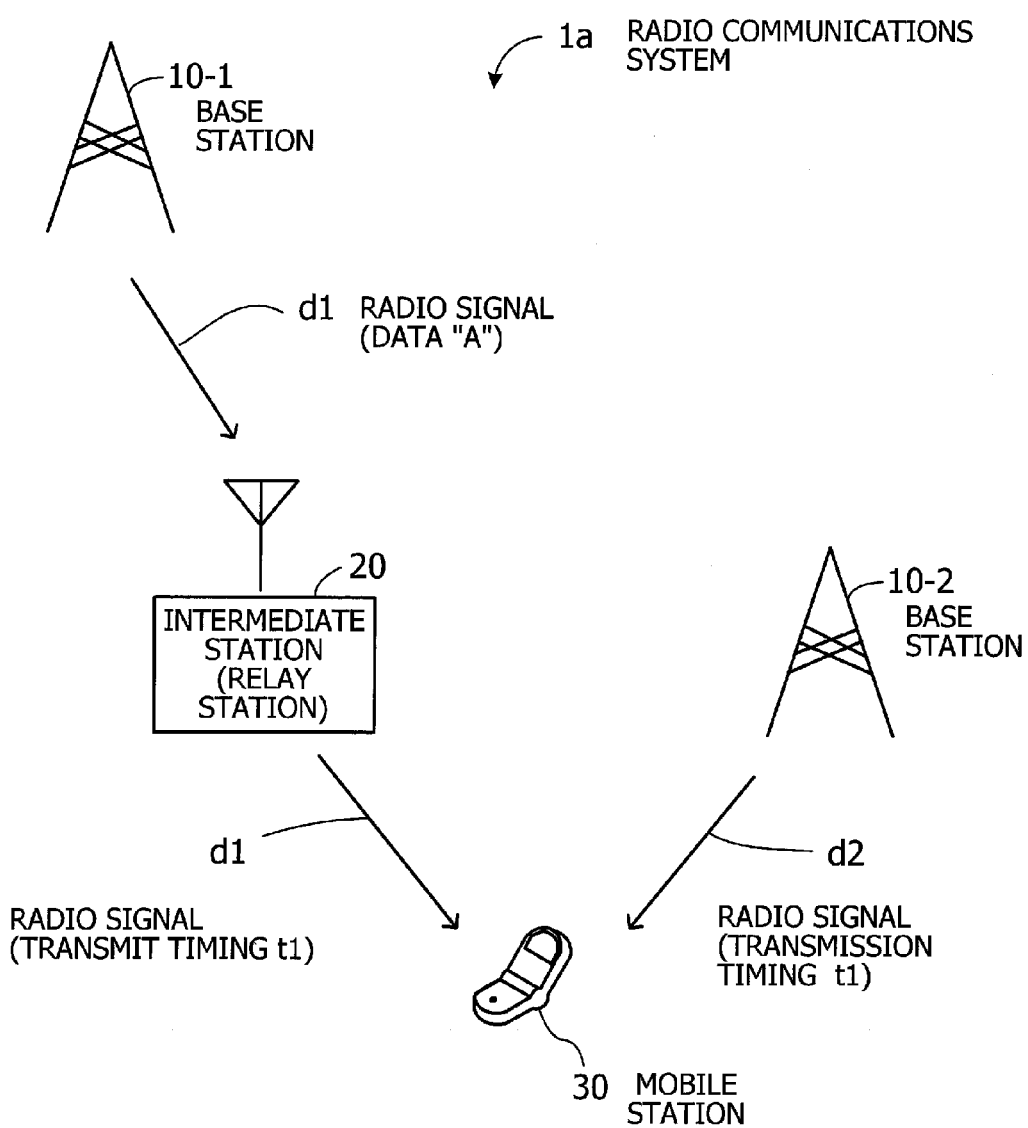
FIG. 1 illustrates an example structure of a radio communications system.

Embodiments of the present invention will now be described below with reference to the accompanying drawings. FIG. 1 illustrates an example structure of a radio communications system. The illustrated radio communications system 1a is formed from a base station (first radio base station) 10-1, another base station (second radio base station) 10-2, an intermediate station (hereafter, "relay station") 20, and a mobile station 30.

The base station 10-1 transmits a radio signal d1. The mobile station 30 is within an area where radio signals forwarded by the relay station 20 can be received. The relay station 20 thus receives the radio signal d1, executes a series of relaying operations on the receive signal, and retransmits the resulting radio signal d1 to the mobile station 30. The relaying operations may include demodulation, decoding with error correction, re-coding, modulation, and the like. Alternatively, the relay station 20 may simply retransmit an amplified version of the received radio signal without decoding.

Another base station 10-2 transmits a radio signal (data "A") d2 (=d1) in synchronization with transmission timing t1 at which the relay station 20 retransmits the radio signal (data "A") d1, by using the same radio resource that the relay station 20 uses for its transmission of the radio signal (data "A") d1. The two radio signals d1 and d2 are thus equivalent to each other.

The same modulation method may be applied to the radio signal d1 and radio signal d2. There is no need, however, to level their transmit powers. Here the base station 10-1 may take the place of the base station 10-2. That is, the base station 10-1 may transmit the original radio signal (data "A") d1 again, in synchronization with the transmission timing t1 at which the relay station 20 transmits its radio signal (data "A") d1.

Further, the relay station 20 and base stations 10-1 and 10-2 may be configured to send the same radio signal (data "A") simultaneously at the timing t1, using the same radio resource.

During the period of forwarding data from the relay station 20 to the mobile station 30, the mobile station 30 receives both the radio signal d1 from the relay station 20 and radio signal d2 from the base station 10-2 (or radio signal d1 retransmitted from the base station 10-1). The two radio signals d1 and d2 carry the same data, and the time difference of their arrival falls within the length of CP. Accordingly, the mobile station 30 can properly receive the data without intersymbol interference by removing the CP from received signals.

To achieve the simultaneous transmission described above, the base stations 10-1 and 10-2 and relay station 20 my be configured to previously synchronize their frame timings with each other, on the basis of, for example, a signal supplied from an appropriate upper-layer apparatus. The apparatuses can then determine a specific timing for their simultaneous transmission.

For example, an upper-layer apparatus notifies the base stations 10-1 and 10-2 and relay station 20 of a specific frame number for simultaneous transmission (which determines the timing t1), so that the stations will transmit the same data by using that specified frame and a common radio resource.

As an alternative setup, the frame number (or timing of simultaneous transmission) may be determined by the scheduler in the relay station 20. The frame number information is then delivered from the scheduler to the base stations 10-1 and 10-2. More specifically, the frame number information is directly transmitted to the base station 10-1 over a radio signal. The base station 10-1 then forwards the information to the base station 10-2 via the upper-level station. Or alternatively, the relay station 20 may send radio signals directly to both base stations 10-1 and 10-2 to let them know the determined frame number.

As another alternative setup, the upper-level station may supply the same data to both base stations 10-1 and 10-2 at the same time, and the base station 10-2 is configured to delay its transmission of the data until the relay station 20 begins forwarding the data received from the base station 10-1, so that the data can be transmitted simultaneously from the base station 10-2 and relay station 20. This delay time may be determined on the basis of, for example, actual measurement or theoretical analysis. While there may be some amount of timing differences between the two transmissions, such error is tolerable because of the presence of CP. That is, the two transmissions are considered to be substantially simultaneous.

The following will discuss some issues about LTE-Advanced systems.

(1) MBMS and MBSFN

MBMS permits data transmission from a single base station to specified or unspecified users. For example, MBMS may be used to broadcast news and other information to the public, or to multicast information to specified users.

MBFSN is under study as a method for transmitting data via MBMS. Specifically, this method permits a plurality of base stations to transmit the same MBMS data in a synchronized way, using the same radio resource.

As indicated by the portion "SFN" (Single Frequency Network) of the name "MBSFN," the communication is performed over the same radio frequency. Normally a particular transmission area (called "MBSFN area") is designated for MBSFN communication, and MBMS data is transmitted by using the same radio frequency within that area (see TS 36.300 V8.6.0 15 MBMS).

Since identical data is transmitted from a plurality of base stations at the same time and at the same frequency, a mobile station may receive multiple signals of MBMS data from different base stations with some time differences. The receiving mobile station takes advantages of this multiple signal reception to eliminate intersymbol interference. That is, in the case where the orthogonal frequency division multiplexing (OFDM) is used for the reception, the mobile station can combine the received radio frequency signals by subjecting them to fast Fourier transform (FFT) after removing their cyclic prefix (CP), if the time differences are not greater than the CP.

CP may also be called "guard interval" (GI). CP used in MBSFN transmission is slightly longer than CP of ordinary unicast data.

Figure 2:
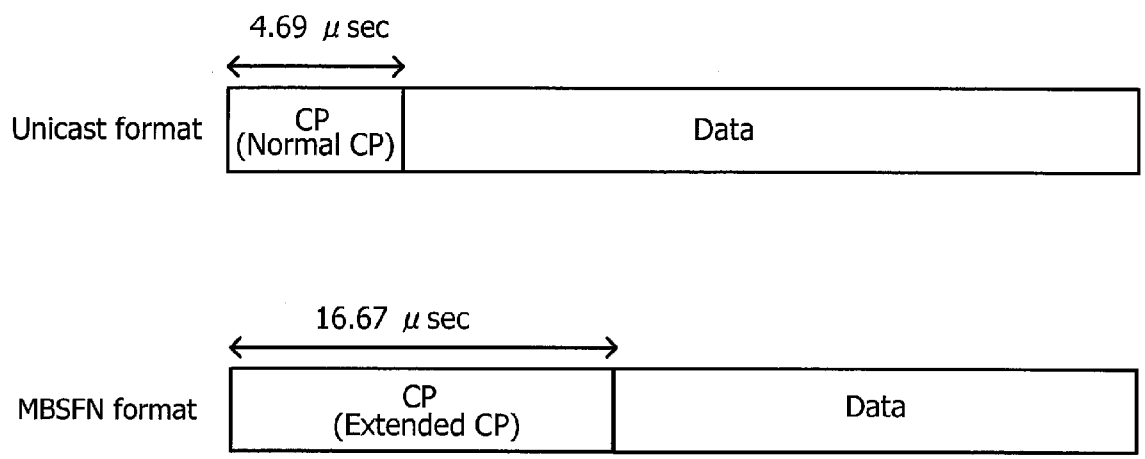
FIG. 2 illustrates formats of radio transmission data.

FIG. 2 illustrates formats of radio transmission data. Each illustrated radio transmission data is formed from CP and data fields. The CP is called "normal CP" in the case of unicast transmission, and "extended CP" in the case of MBSFN transmission. The length of CP for MBSFN (or the CP length of MBMS data) is 16.67 μsec, whereas the length of normal CP is 4.69 μsec.

Figure 3:
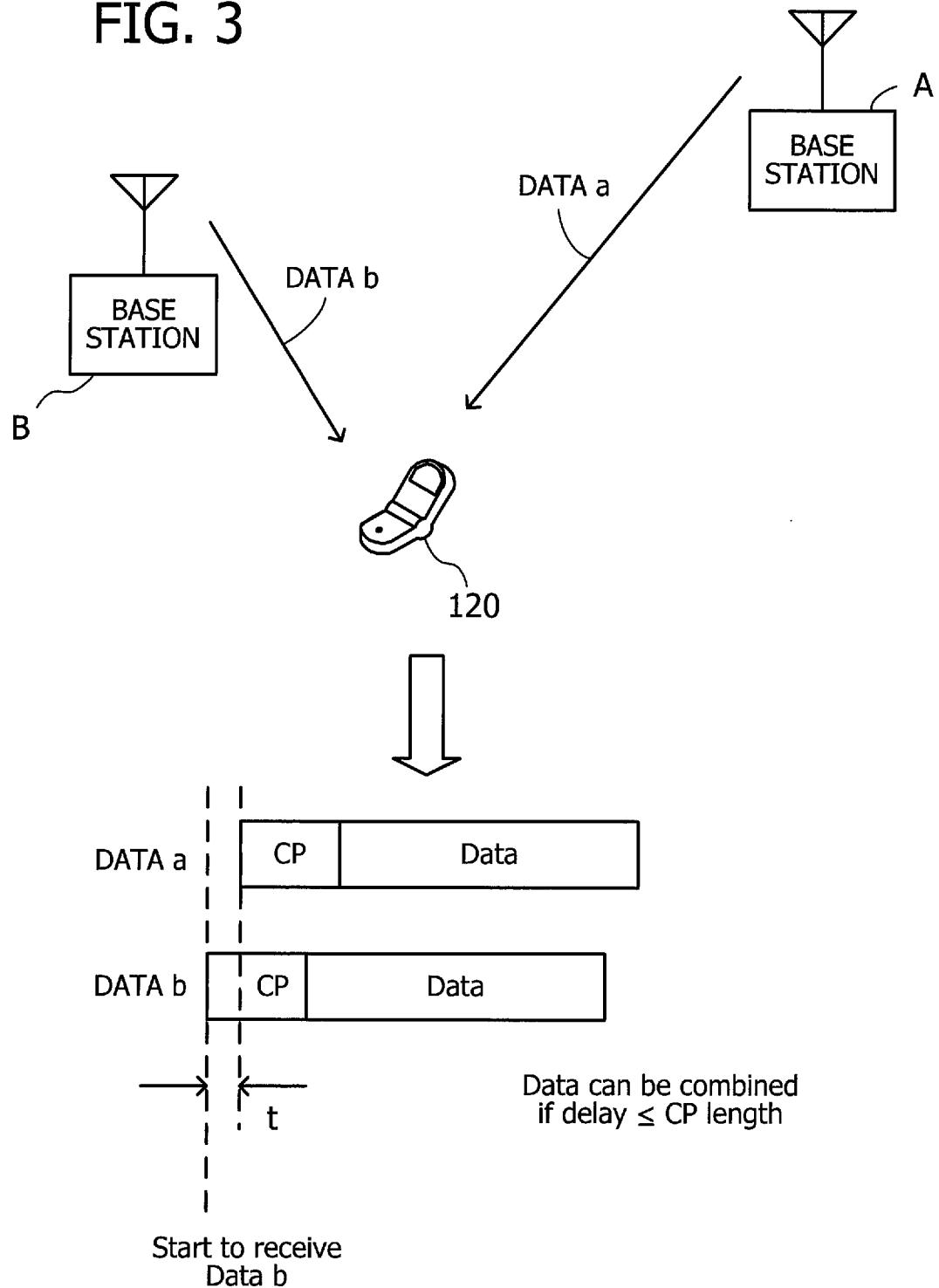
FIG. 3 illustrates how data is received.

FIG. 3 illustrates how data is received. Suppose here that a mobile station 120 first receives MBMS data (data "b") sent from one base station B. Another base station A similarly transmits MBMS data (data "a"), and the mobile station 120 receives it with a delay time of t after data "b." Both data "a" and data "b" contain the same service information.

As long as the delay time t is within a time range from the beginning of receive data "b" to the end of its CP, the mobile station 120 can simply remove signals in the CP period and treat the remaining signals in the FFT period as only containing the same data with the same frequency. The mobile station 120 thus receives the data without intersymbol interference. MBSFN uses a longer CP as mentioned above, thus making it possible for the mobile station to combine received MBMS data signals from different base stations even if one base station (e.g., base station A) is more distant from others.

(2) Intermediate Device (Relay Station)

The LTE-Advanced system may include a relay station (or simply "relay") between a base station and mobile stations for the purpose of cell extension, i.e., to extend the service coverage area, or for the purpose of eliminating dead spots.

Figure 4:
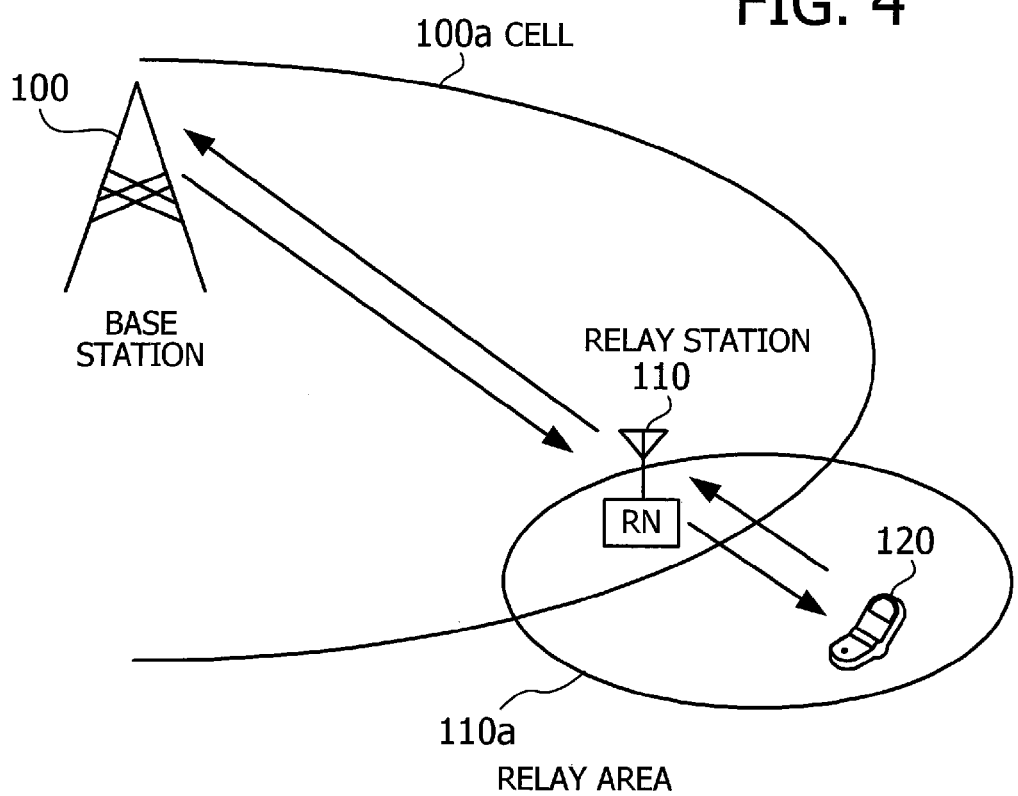
FIG. 4 illustrates extension of a service coverage area.

FIG. 4 illustrates extension of a service coverage area. The illustrated base station 100 has its cell 100*a*, but a mobile station 120 is located out of the reach of the base station 100. A relay station 110 is deployed in the cell 100*a* to provide an additional coverage area, or relay area 110*a*. The mobile station 120 is in this relay area 110*a*.

Without intermediate stations like the illustrated relay station 110, the mobile station 120 is too far from the base station 100 to communicate with it. The relay station 110 relays radio signals to and from the base station 100, thus enabling the mobile station 120 in its relay area 110*a* to communicate with the base station 100 even if its current location is out of the cell 100*a*.

Figure 5:
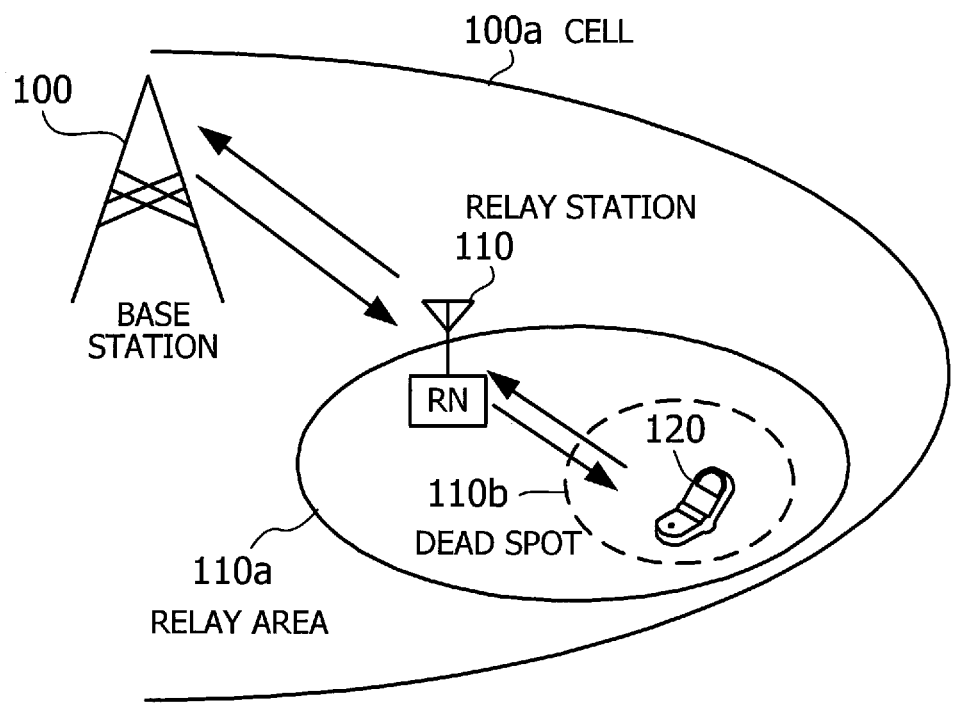
FIG. 5 illustrates countermeasures against dead spots.

FIG. 5 illustrates countermeasures against dead spots. The illustrated cell 100*a* of a base station 100 has a dead spot 110*b*, where a mobile station 120 is visiting. A relay station 110 is placed in the cell 100*a* and provides a relay area 110*a* to cover the dead spot 110*b*.

Without intermediate stations like the relay station 110, it is difficult for the mobile station 120 in the dead spot 110*b* to communicate with the base station 100. In the relay area 110a, the relay station 110 relays radio signals to and from the base station 100, thus allowing the mobile station 120 to communicate with the base station 100 even from within the dead spot 110b.

As a conventional technique related to MBMS, Japanese National Publication of International Patent Application No. 2008-503130, paragraphs [0015] to [0020], FIG. 1 noted below proposes a technique that permits a mobile station to estimate the quality of surrounding cells on the basis of difference in the transmit power between their common pilot channel and common control channel and choose a cell with the highest quality to receive data.

Also, as a conventional technique for relaying radio signals, Japanese Laid-open Patent Publication No. 10-032557, paragraphs [0019] to [0021], FIG. 1 noted below proposes a technique of transmitting signals in a hierarchical manner. According to the proposed technique, a transmitting device transmits a signal for the purpose of relaying via an intermediate device, together with a signal for the purpose of direct reception by a receiving device. The intermediate device demodulates the former signal selectively and retransmits the signal by modulating it again.

As described above, the MBMS wireless network can use relay stations to extend its service coverage area or eliminate dead spots, and the radio signals for MBSFN have an extended CP which is longer than the normal CP used in ordinary unicast transmission. These features enable a mobile station to receive radio signals from a remote base station via a relay station, thus making it more likely for the mobile station to receive and combine a larger number of data signals.

The conventional MBMS wireless network, however, may encounter a problem of interference between an MBMS data signal forwarded by a relay station and other signals (e.g., unicast data signals) transmitted by other base stations.

Figure 6:
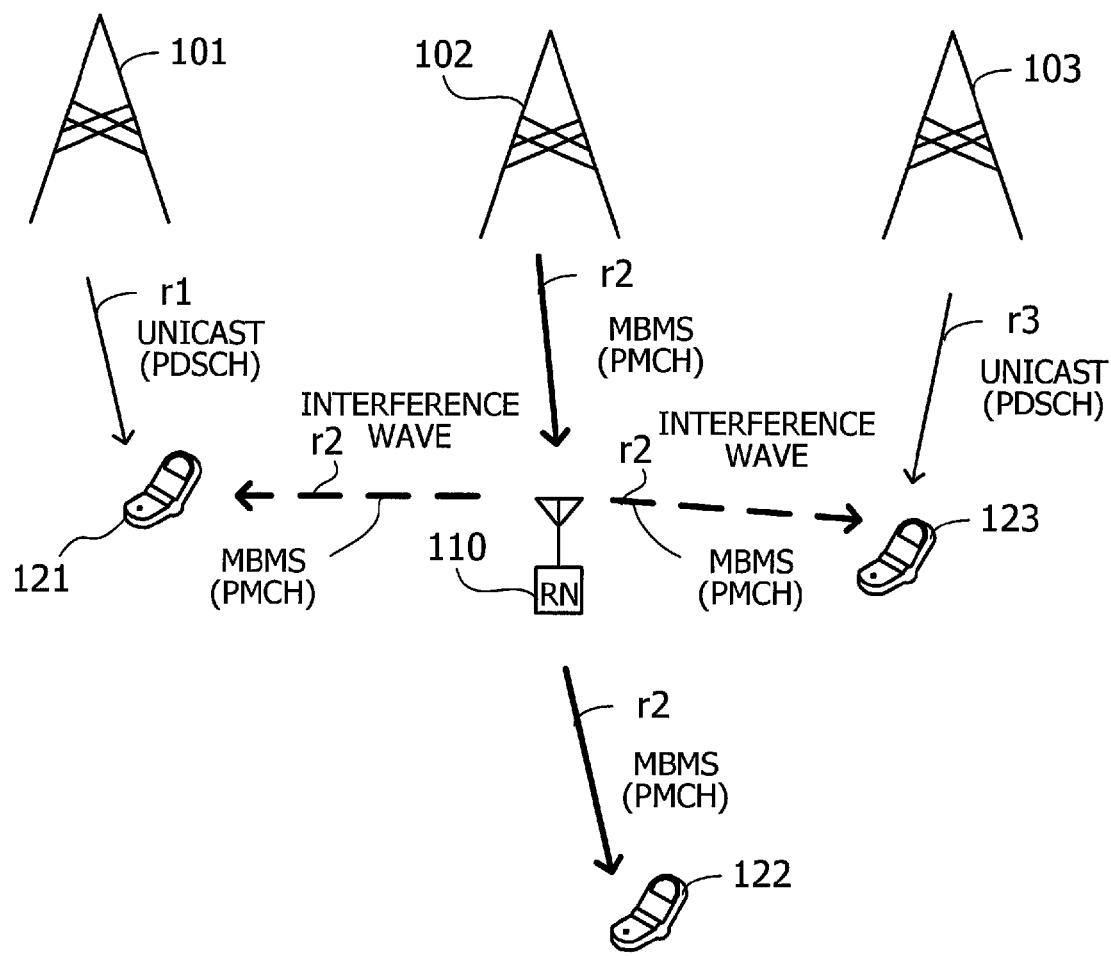
FIG. 6 illustrates a problem of interference.

FIG. 6 illustrates a problem of interference. The illustrated system includes base stations 101 to 103, mobile stations 121 to 123, and a relay station 110. One base station 101 transmits unicast data r1 to a mobile station 121. Another base station 103 transmits unicast data r3 to another mobile station 123. Yet another base station 102 transmits MBMS data r2 to the relay station 110, which forwards the MBMS data r2 to yet another mobile station 122.

It is assumed here that, as seen in FIG. 6, the mobile station 121 can receive both unicast data r1 and MBMS data r2. Similarly the mobile station 123 can receive both unicast data r3 and MBMS data r2.

In the environment described above, the MBMS data r2 transmitted from the relay station 110 may act as interference waves that hamper the mobile stations 121 and 123 from receiving unicast data.

Figure 7:
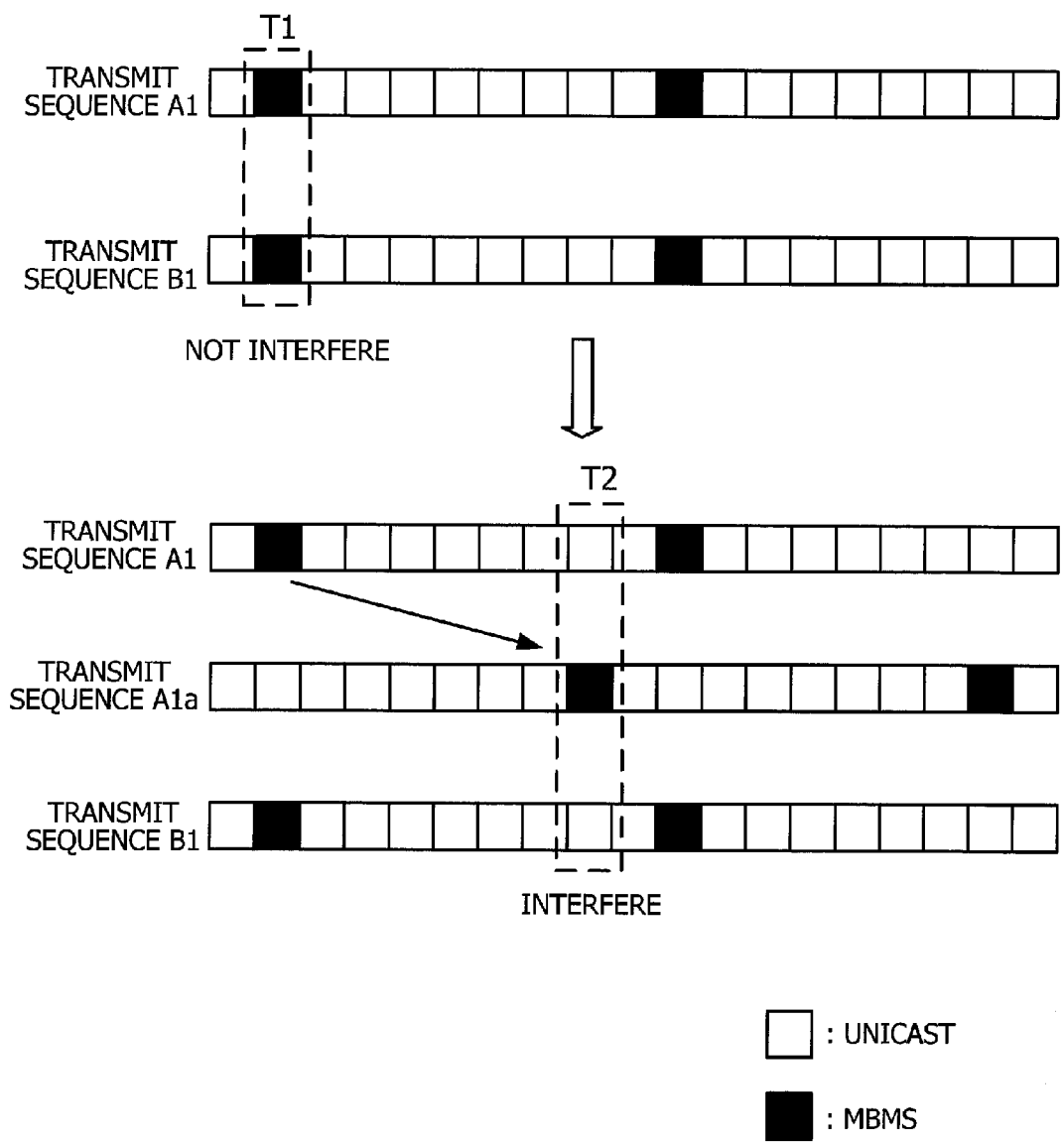
FIG. 7 illustrates an interference produced by timing differences.

FIG. 7 illustrates an interference caused by timing differences. The black slots indicate MBMS data of MBSFN transmission, and the white slots indicate unicast data. For example, timing T1 is where two pieces of MBMS data are transmitted simultaneously from different base stations, which allows the receiving mobile station to combine the two.

An intermediate station receives transmit sequence A1 and relays it as transmit sequence A1a. This relaying operation takes some time and thus causes a delay of transmit sequence A1a. The intermediate station thus transmits the MBMS data at timing T2, which has originally been transmitted by neighboring base stations in a synchronized manner as depicted by the first black slots in transmit sequences A1 and B1.

It is noted, however, that the base stations send other data during the period of timing T2. Accordingly, the MBMS data from the intermediate station interferes with the transmit data of those base stations, and vice versa, thus causing a quality degradation of transmitted signals.

What has been described above is not a particular problem of MBMS data. The same problem could happen to other data signals if they are relayed by an intermediate station with some delay. That is, the noted problem arises from the fact that neighboring base stations transmit their own data by using the same radio resource that is being used by the intermediate station to execute a relay transmission.

The following sections will describe the structure and operation of an MBMS system as an example application of the proposed radio communications system 1a. The description begins with an overview of an MBSFN network in which the radio communications system 1a is to be implemented.

Figure 8:
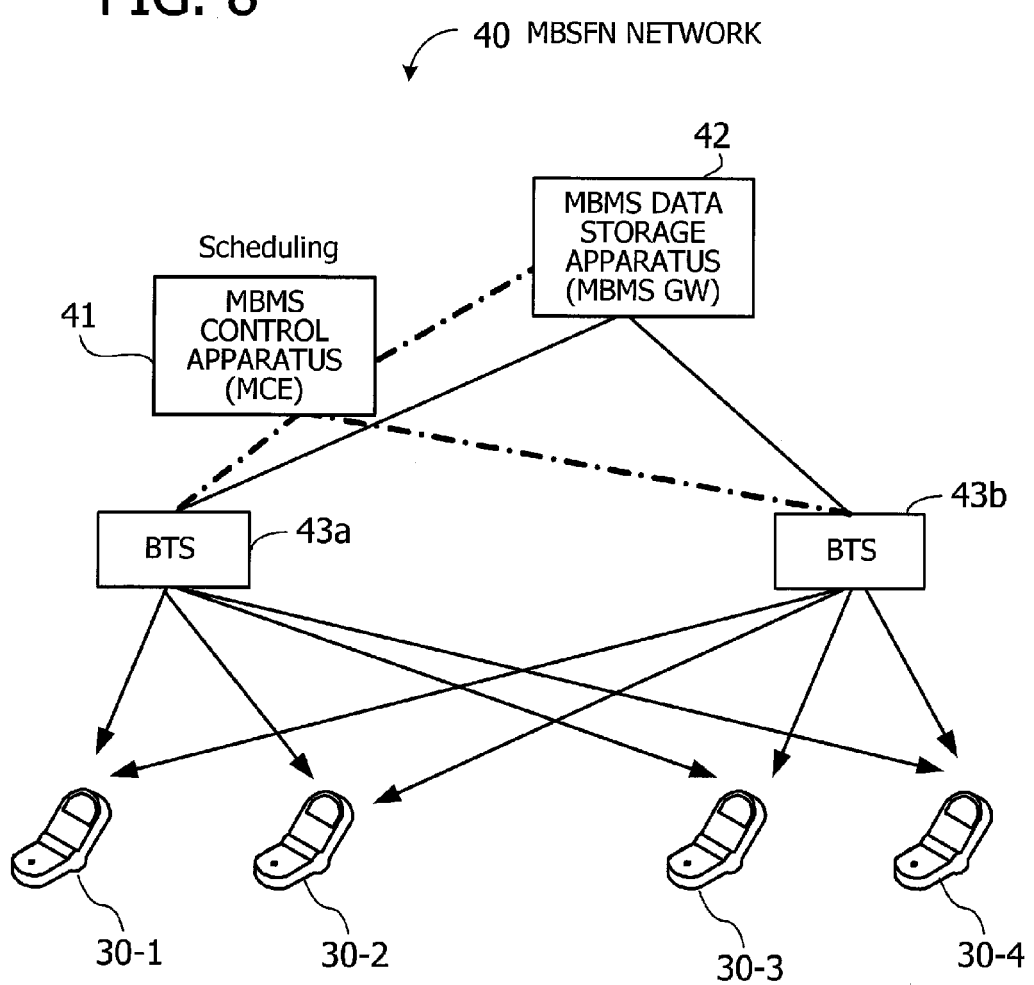
FIG. 8 illustrates an MBMS network (MBSFN).

FIG. 8 illustrates an MBSFN network. This MBSFN network 40 includes an MBMS transmission control apparatus or MBMS controller (collectively, "MBMS control apparatus") 41, an MBMS data storage apparatus 42, base stations (base transceiver stations, or BTS) 43a and 43b, and mobile stations 30-1 to 30-4. For example, the MBMS control apparatus 41 may serve as a multi-cell/multicast coordination entity (MCE). The MBMS data storage apparatus 42 is a device that stores and manages MBMS data. For example, the MBMS data storage apparatus 42 may serve as an MBMS gateway (GW).

Radio signals of MBMS contain MBMS data and control signals for receiving MBMS. The description will refer to the latter as "MBMS control signals." The MBMS control apparatus 41 controls MBMS transmission and sends MBMS control signals to base stations 43a and 43b, as well as to the MBMS data storage apparatus 42. The MBMS data storage apparatus 42 sends MBMS data to the base stations 43a and 43b.

The MBMS data constitutes a logical channel called "MBMS traffic channel" (MTCH), which is mapped on a transport channel called "multicast channel" (MCH) and transmitted wirelessly over a radio channel called "physical multicast channel" (PMCH).

The MBMS control signals, on the other hand, constitute another logical channel called "multicast control channel" (MCCH), which is mapped on a transport channel MCH and transmitted wirelessly over a radio channel PMCH.

The MBMS control apparatus 41 performs scheduling of signal transmission, including allocation of resources and selection of a modulation and coding scheme (MCS), and timing of MBMS data transmission. The MBMS control apparatus 41 sends the result of this scheduling operation by combining it into MBMS control signals. Based on the scheduling result, the base stations 43a and 43b execute radio transmission.

MCS, also called "adaptive modulation and coding (AMC), is a way of modulating and coding signals while changing modulation methods and coding rates adaptively to the quality of radio transmission channels. Specifically, each MCS is a combination of attributes specifying a modulation method, code rate, the amount of transmit data (eventually means transmission rate), and the like.

For example, MCS1 specifies using quadrature phase shift keying (QPSK) as the modulation method, as well as a code rate of ⅛ and a transfer rate of 1.891 Mb/s. MCS5, on the other hand, specifies using quadrature amplitude modulation (16QAM) as the modulation method, a code rate of ½, and a transfer rate of 15.221 Mb/s. Usually an optimal MCS is selected depending the condition of signal reception at mobile stations.

The MBMS control apparatus 41 selects one of those MCSs by using an appropriate method. One example of such an MCS selection method is to find a cell that is the worst in terms of the characteristics of signal propagation (propagation environment), select an MCS for that cell, and apply the same MSC to the entire MBSFN area.

For example, when MCS1 is determined to be used for communication in the cell with the worst propagation characteristics, the MBMS control apparatus 41 applies this MCS1 to every other cell in the MBSFN area even if some cells have good propagation characteristics. As an alternative method, the MBMS control apparatus 41 may use a specific MCS regardless of the actual propagation environment.

Figure 9:
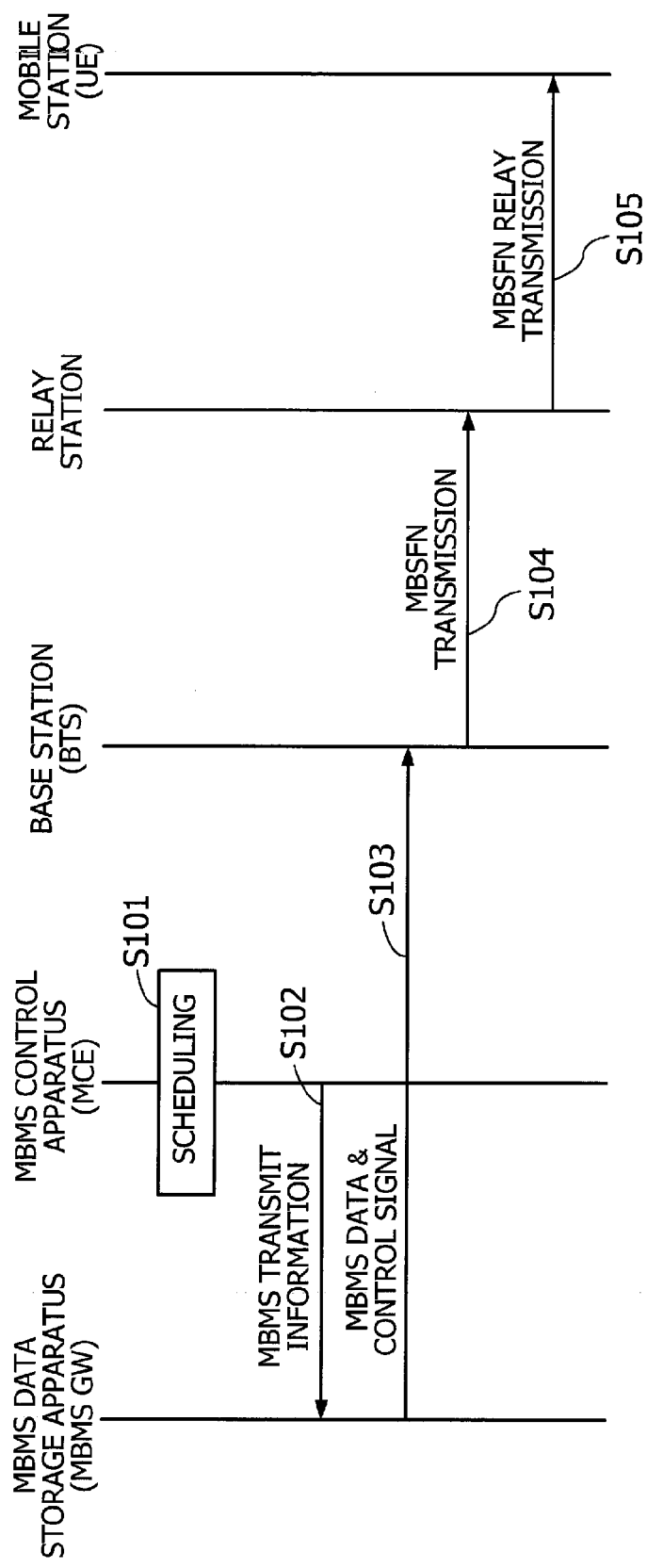
FIG. 9 illustrates an operation sequence of the MBMS network (MBSFN).

FIG. 9 illustrates an operation sequence of the MBMS network (MBSFN).

(S101) The MBMS control apparatus 41 performs a scheduling operation to determine which MBMS data to send and which transmission method (e.g., modulation method, coding scheme, transmission timing, radio frequency) to use to send that MBMS data.

(S102) The MBMS control apparatus 41 informs the MBMS data storage apparatus 42 of the determined modulation method, coding scheme, and other things, as well as sending a control signal produced on the basis of those decisions. The MBMS control apparatus 41 further requests the MBMS data storage apparatus 42 to send the MBMS data to base stations 43a and 43b.

(S103) Upon receipt of the above information, the MBMS data storage apparatus 42 sends a control signal (MCCH) and MBMS data (MTCH) to the base stations 43a and 43b. Further, the MBMS data storage apparatus 42 provides the base stations 43a and 43b with control data that specifies transmission timing, radio frequency, and other parameters for MBSFN transmission.

(S104) Upon receipt of the above control data, MBMS data, and control signal, the base stations 43a and 43b conducts MBSFN transmission according to the received control data.

(S105) Upon receipt of the above MBSFN transmission, the Decode and Forward (DF) relay performs demodulation and decoding of the received MBMS data, corrects errors if any, performs coding and modulation again, and transmits the resulting MBMS data to the given mobile station.

Figure 10:
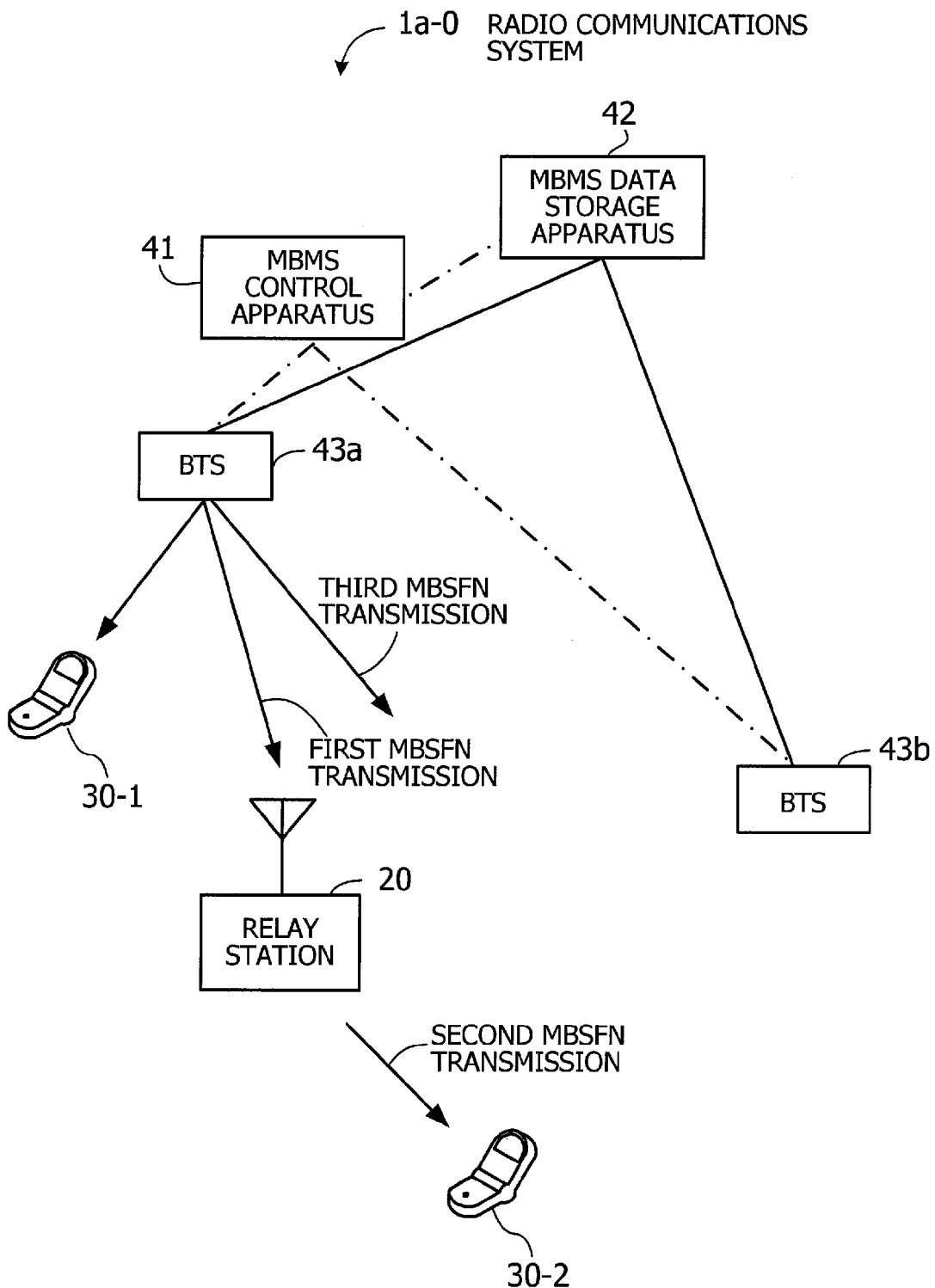
FIG. 10 illustrates a radio communications system.

This section will describe how the foregoing radio communications system 1a works when applied to the MBSFN network 40. FIG. 10 illustrates an example structure of a radio communications system. This radio communications system 1a-0 includes an MBMS control apparatus 41, an MBMS data storage apparatus 42, base stations 43a and 43b, a relay station 20, and mobile stations 30-1 and 30-2. The base station 43a communicates with a mobile station 30-1, as well as with another mobile station 30-2 via the relay station 20.

In operation, the relay station 20 receives MBMS data that the base station 43a transmits with an MBSFN format, so that the base stations 43a and 43b can transmit the same MBMS data in a synchronized manner. The relay station 20 demodulates and decodes the received signal to reproduce the transmitted MBMS data.

Since the transmission is made with an MBSFN format, the relay station 20 may be configured to receive MBMS data, not only from the source base station 43a, but also from other base stations (e.g., base station 43b). The original transmission of MBMS data from base station 43a to relay station 20 will now be referred to as the "first MBSFN transmission."

The relay station 20 demodulates and decodes received signals of the first MBSFN transmission, corrects errors if any, and stores the reproduced MBMS data. Subsequently the relay station 20 reads out the temporarily stored MBMS data and transmits it to the mobile station 30-2 after coding and modulation. The relay station 20 executes this transmission of MBMS data at transmission timing t1 (also referred to as "MBSFN relay timing") which comes some time after the reception of the original MBMS frame. The transmission of MBMS data from the relay station 20 to the mobile station 30-2 is referred to herein as the "second MBSFN transmission."

At the MBSFN relay timing of the relay station 20, other relay stations (not illustrated) and the base station 43b are only allowed to transmit data for MBSFN. In other words, it is not allowed to transmit data other than MBSFN transmission (e.g., transmission of unicast data in the form of unicast communication).

Referring to the example of FIG. 10, the base station 43b transmits the same MBMS data at the MBSFN relay timing. The base station 43b, however, but performs no other transmission such as unicast data in the form of unicast communication.

The mobile station 30-2 receives MBMS data transmitted from the base station 43b and relay station 20 at the MBSFN relay timing. The same pieces of MBMS data arrive at the mobile station 30-2 during the period of the second MBSFN transmission, which improves the performance characteristics of transmission.

The mobile station 30-2 may further be able to receive MBMS data retransmitted by the base station 43a in addition to the MBMS data of the second MBSFN transmission at the MBSFN relay timing. The retransmission of MBMS data that the base station 43a performs at transmission timing t1 is referred to as the "third MBSFN transmission." This third MBSFN transmission can be received together with the second MBSFN transmission since they carry MBMS data for the same MBSFN.

The above operation of the radio communications system 1a-0 controls its radio resources so as not to use the same resource to transmit different data during the period of transmission timing t1. This feature prevents interference from happening.

In the MBSFN transmission, the mobile station 30-2 is allowed to receive MBMS data from multiple sources, i.e., the base stations 43a and 43b and relay station 20. Further the mobile station 30-2 can receive multiple MBMS data in multiple MBSFN transmissions, making it possible to improve the performance characteristics of MBSFN transmission.

Figure 11:
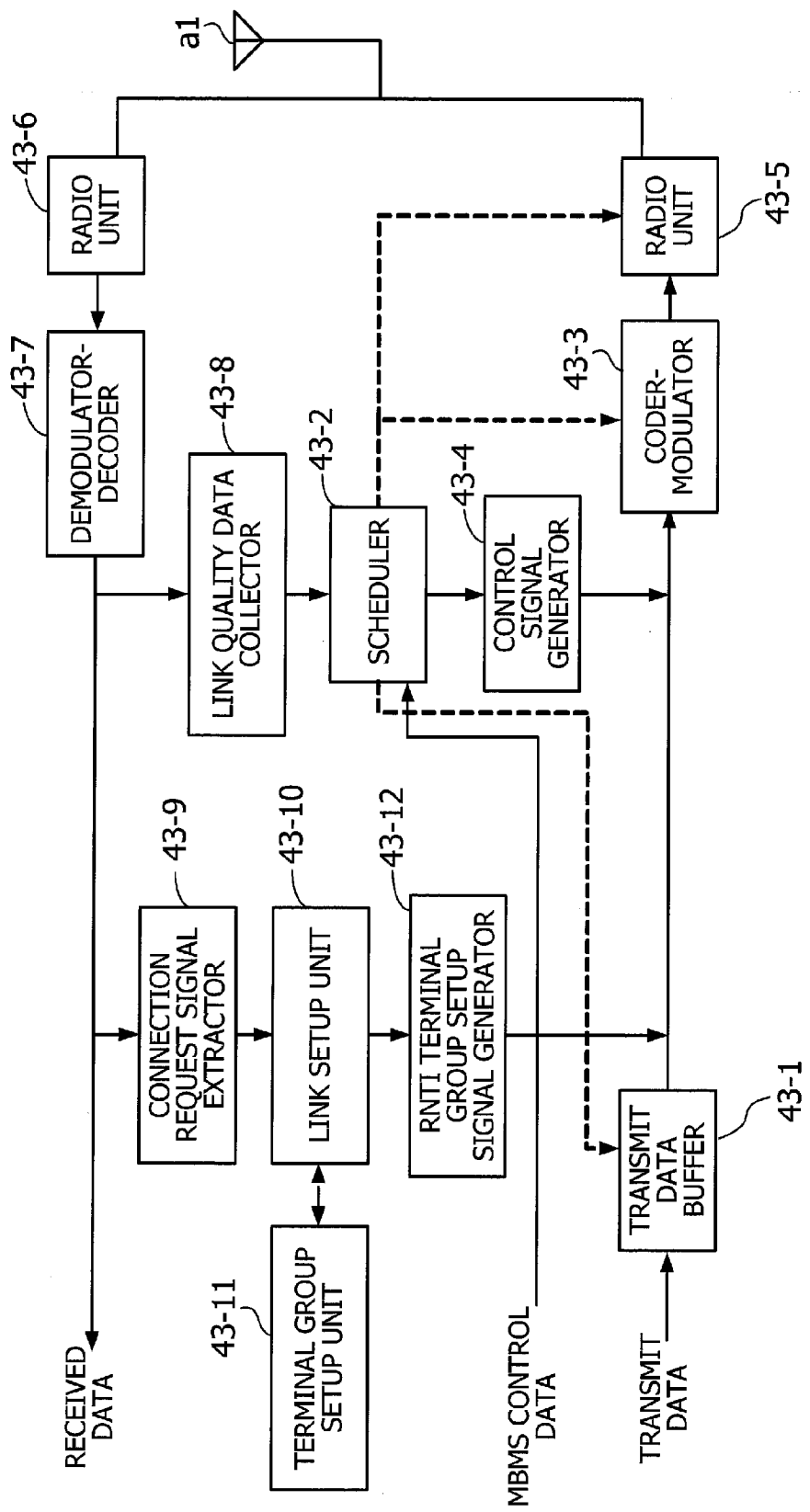
FIG. 11 illustrates a structure of a base station.

The base stations 43a and 43b are both configured as follows. FIG. 11 illustrates a structure of a base station. The illustrated base station 43 includes a transmit data buffer 43-1, a scheduler 43-2, a coder-modulator 43-3, a control signal generator 43-4, radio units 43-5 and 43-6, a demodulator-decoder 43-7, a link quality information collector 43-8, a connection request signal extractor 43-9, a link setup unit 43-10, a terminal group setup unit 43-11, and a radio network temporary ID (RNTI) terminal group setup signal generator 43-12.

When transmit data (including MBMS data) is received from an upper-level station such as an MBMS control device, the base station 43 stores the transmit data in a transmit data buffer 43-1. The transmit data is read out of the transmit data buffer 43-1 according to scheduling control performed by the scheduler 43-2 and then supplied to the coder-modulator 43-3.

The base station 43 also receives MBMS control data from an upper-level station such as an MBMS control device (other base station). This MBMS control data gives the scheduler 43-2 a specific timing (e.g., frame timing) as to when to transmit MBMS data.

In the case where the illustrated base station 43 serves as the base station 43b in the system of FIG. 10, MBMS control data may specify, for example, transmission of MBMS data at transmission timing t1. In the case where the base station 43b is supposed to transmit data simultaneously with the first MBSFN transmission from the base station 43a, the MBMS control data may indicate the timing of the first MBSFN transmission, in addition to specifying the transmission timing t1. Which radio resources (frequencies, modulation methods, and the like) to use in MBSFN transmission may previously be determined and stored as radio resource information. Or alternatively, the MBMS control data may indicate which resource to use.

The scheduler 43-2 may control the control signal generator 43-4 so as to produce and supply a control signal to the coder-modulator 43-3 when it is necessary for the scheduler 43-2 to transmit such a signal.

This control signal may contain, for example, control commands for a relay station or a mobile station. The coder-modulator 43-3 subjects a signal to the process of error correction coding and modulation. The radio unit 43-5 assigns subcarriers to the processed signal, so that an OFDM signal is produced through Inverse FFT (IFFT) processing and the like. After amplification, frequency conversion, and other necessary processing, the resulting radio signal, with a preceding CP, is transmitted via the antenna a1.

Incoming radio signals, on the other hand, arrive at the antenna a1 from a relay station or mobile station. The radio unit 43-6 subjects the received radio signal to bandpass filtering, removal of CP, FFT, and other necessary processing. The signal then undergoes demodulation and decoding by the demodulator-decoder 43-7.

The received signals may contain some information about measurement results concerning the quality of downlink signals (i.e., the radio signals transmitted from the base station 43). In this case, the link quality data collector 43-8 collects such link quality data and supplies the collected data to the scheduler 43-2. The link quality data enables the scheduler 43-2 to recognize the current quality of receive signals from each individual mobile station and relay station. The scheduler 43-2 can therefore select an appropriate coding rate and modulation method for use by the coder-modulator 43-3 in accordance with the receive signal quality.

The received signals may also include connection request signals from a mobile station, relay station, and the like. When this is the case, the connection request signal extractor 43-9 extracts those connection request signals and supplies them to the link setup unit 43-10. The terminal group setup unit 43-11 divides subordinate mobile stations and relay stations into groups. Based on the connection request signals and the grouping result, the link setup unit 43-10 sets up a link and sends the resulting link setup data to the RNTI terminal group setup signal generator 43-12. The RNTI terminal group setup signal generator 43-12 controls setup of terminal groups, assigning a unique RNTI to each different group, and places group information in transmit data. More details of the grouping operation will be discussed in a later section.

Figure 12:
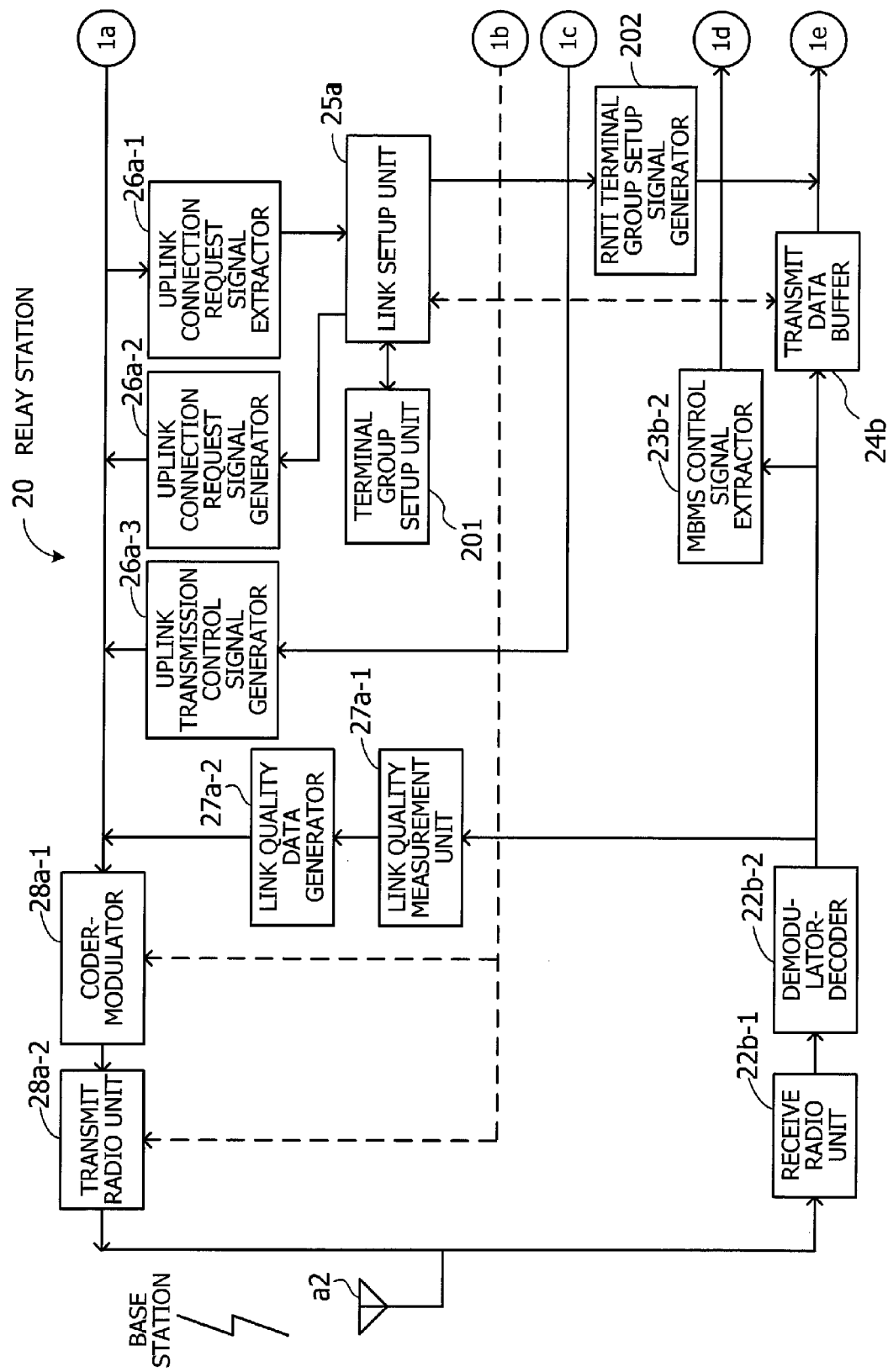
FIG. 12 illustrates a structure of a relay station.
Figure 13:
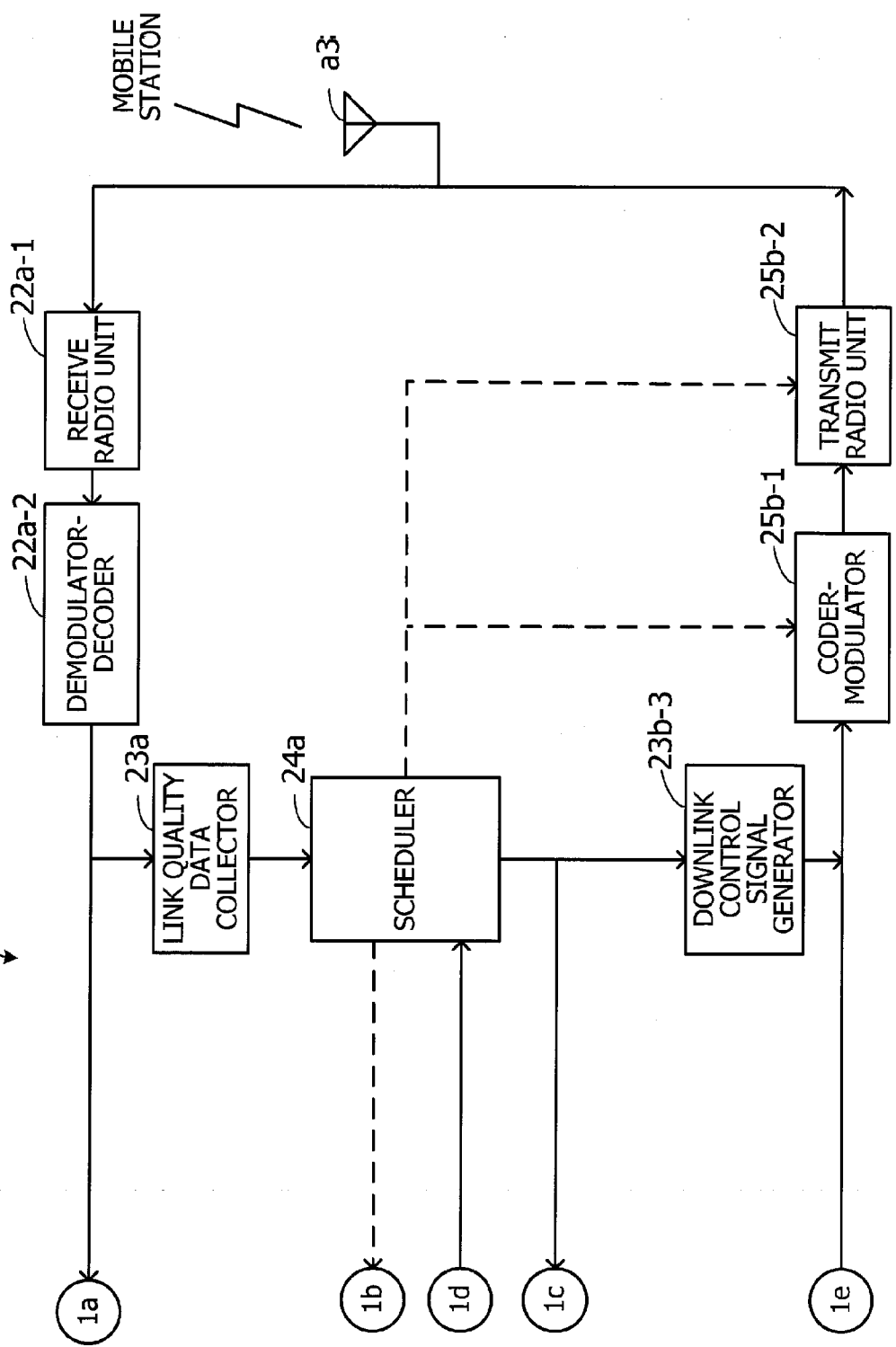
FIG. 13 illustrates a structure of a relay station.

An example configuration of the relay station 20 will now be described below. FIGS. 12 and 13 illustrate a structure of the relay station 20. The illustrated relay station 20 includes antennas a2 and a3, receive radio units 22a-1 and 22b-1, demodulator-decoders 22a-2 and 22b-2, a link quality data collector 23a, an MBMS control signal extractor 23b-2, a downlink control signal generator 23b-3, a scheduler 24a, a transmit data buffer 24b, a link setup unit 25a, an uplink connection request signal extractor 26a-1, an uplink connection request signal generator 26a-2, an uplink transmission control signal generator 26a-3, a link quality measurement unit 27a-1, a link quality data generator 27a-2, coder-modulators 25b-1 and 28a-1, transmit radio units 25b-2 and 28a-2, a terminal group setup unit 201, and an RNTI terminal group setup signal generator 202.

With its antenna a2, the relay station 20 receives a signal from the base station 43. The received signal is supplied to the receive radio unit 22b-1, where a given frequency band is extracted. The receive radio unit 22b-1 applies FFT processing to the signal after removing CP. The demodulator-decoder 22b-2 executes demodulation and decoding of the signal.

The decoded signal (including MBMS data) is then input to the transmit data buffer 24b. The signal is read out of the transmit data buffer 24b as scheduled by the scheduler 24a and supplied to the coder-modulator 25b-1.

In the case where the received signal contains an MBMS control signal, the MBMS control signal extractor 23b-2 extracts it for use by the scheduler 24a. This MBMS control signal specifies a specific timing (t1). The scheduler 24a is supposed to transmit MBMS data at the specified timing.

Which radio resources (frequencies, modulation methods, and the like) to use in MBSFN transmission may previously be determined and stored as radio resource information. Or alternatively, the MBMS control data may indicate which resource to use. In the case where the MBMS control signal contains such radio resource information, the scheduler 24a executes MBSFN transmission (i.e., transmission of MBMS data) by using specified radio resources.

The scheduler 24a also commands the downlink control signal generator 23b-3 to produce a control signal when there is a need for sending it to a mobile station. The coder-modulator 25b-1 subjects such control signals and MBMS data to a coding and modulation process and passes the resulting signal to the transmit radio unit 25b-2. The transmit radio unit 25b-2 performs amplification and other necessary processing for wireless transmission and outputs the produced radio signal via the antenna a3.

The relay station 20 further receives a radio signal with its antenna a3. The received radio signal is supplied to the receive radio unit 22a-1. The receive radio unit 22a-1 extracts a given frequency band and provides the extracted signal to the demodulator-decoder 22a-2 for demodulation and decoding. Under the control of the scheduler 24a, the decoded signal is supplied to the coder-modulator 28a-1 for coding, modulation, and other processing. After that, the transmit radio unit 28a-2 performs IFFT, insertion of CP, and other necessary processing on the signal. The resulting OFDM signal is transmitted to a base station via the antenna a2.

The data decoded by the demodulator-decoder 22a-2 may contain link quality data. When this is the case, the link quality data is supplied to the link quality data collector 23a so that the scheduler 24a can use it to achieve adaptive modulation control. The decoded data may also contain an uplink connection request signal. In this case, the uplink connection request signal extractor 26a-1 extracts that signal for use in the link setup unit 25a. The uplink connection request signal generator 26a-2 then produces an uplink connection request signal and supplies it to the coder-modulator 28a-1 in order to notify the base station of the presence of an uplink connection request.

When it is necessary to transmit a control signal, the scheduler 24a executes it by commanding the uplink transmission control signal generator 26a-3 to produce and send a control signal to the coder-modulator 28a-1.

The link quality measurement unit 27a-1 observes signals received from the base station to measure the link quality. The measurement result is input to the link quality data generator 27a-2 to produce link quality data. This link quality data is transmitted via the coder-modulator 28a-1. The relay station 20 may set up a terminal group. In that case, the terminal group setup unit 201 produces group information describing a group and sends that information to the link setup unit 25a. The link setup unit 25a places this group information in an uplink connection request signal for transmission in the uplink direction. The RNTI terminal group setup signal generator 202 controls setup of terminal groups by assigning a unique RNTI to each different group, and places the group information in transmit data.

Figure 14:
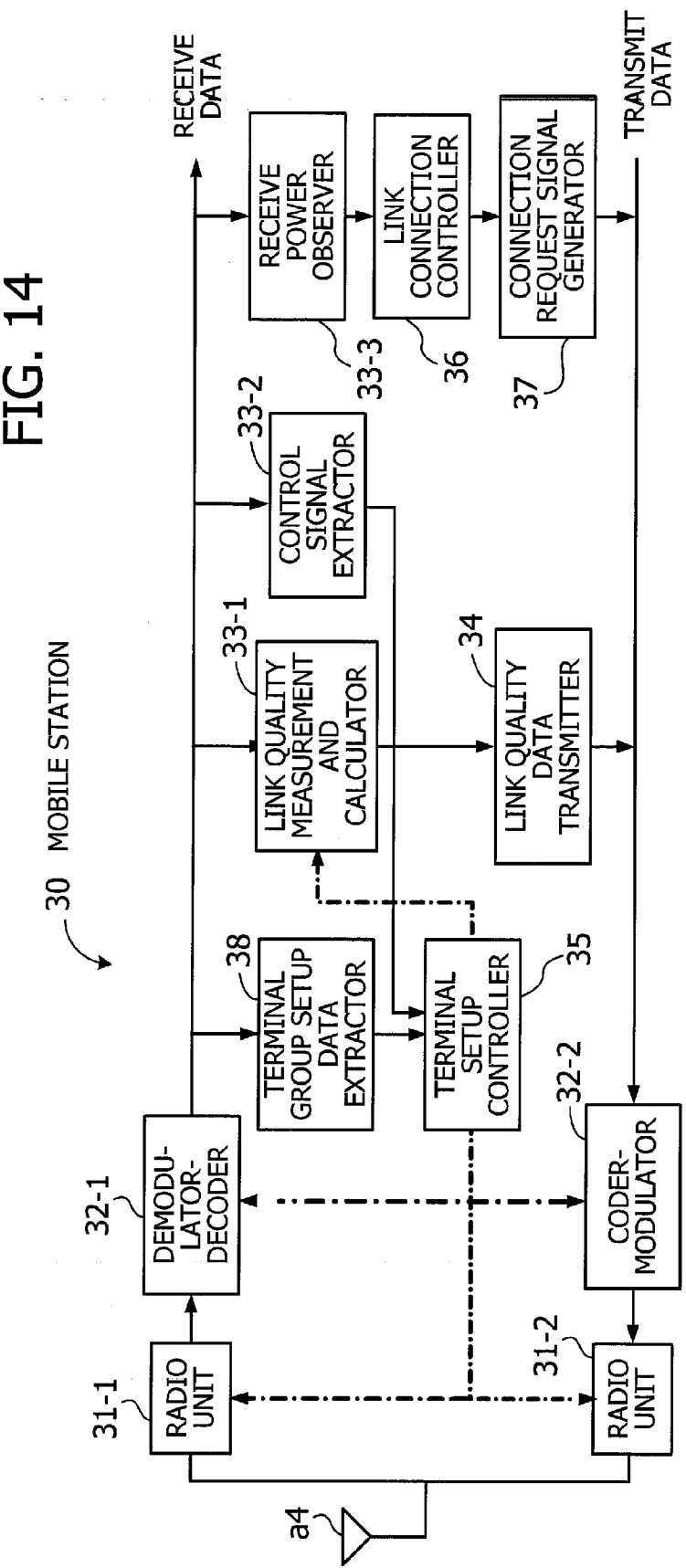
FIG. 14 illustrates a structure of a mobile station.

An example structure of a mobile station will now be described below. FIG. 14 illustrates a structure of a mobile station. The illustrated mobile station 30 includes an antenna a4, radio units 31-1 and 31-2, a demodulator-decoder 32-1, a coder-modulator 32-2, a link quality measurement and calculator 33-1, a control signal extractor 33-2, a receive power observer 33-3, a link quality data transmitter 34, a terminal setup controller 35, a link connection controller 36, a connection request signal generator 37, and a terminal group setup data extractor 38.

With its antenna a4, the mobile station 30 receives a signal from a relay station or base station. The received signal is supplied to the radio unit 31-1. The radio unit 31-1 extracts a given frequency band, removes CP, and applies FFT processing, before passing the signal to the demodulator-decoder 32-1. The radio unit 31-1 also receives MBMS data signals transmitted simultaneously from both the relay station and base station 43b (and further from the base station 43a) at transmission timing t1. The intersymbol interference in those MBMS data signals can be eliminated by removing CP, as long as their receive time difference is within the length of CP.

The demodulated and decoded signal further goes to the link quality measurement and calculator 33-1, control signal extractor 33-2, receive power observer 33-3, and terminal group setup data extractor 38. The receive data is input to a data processor (not illustrated). The link quality measurement and calculator 33-1 measures the quality of the received radio signal in terms of, for example, carrier to interference and noise ratio (CINR) and supplies the measurement result to the link quality data transmitter 34. The link quality data transmitter 34 transmits the measurement result to the relay station or base station as link quality data. This link quality data may be used to control adaptive modulation of downlink signals.

In the case where the receive data contains control signals, the control signal extractor 33-2 extracts and supplies them to the terminal setup controller 35. Based on the control signals, the terminal setup controller 35 controls the radio units 31-1 and 31-2 for reception and transmission, as well as the demodulator-decoder. Controls signals sent from base stations and relay stations may specify, for example, radio resources, coding rate, and modulation method for use in data transmission.

The receive power observer 33-3 measures the power level of known signals (e.g., pilot signals, preamble signals) from base stations and relay stations, thereby identifying the presence of such stations. The measurement result of signal power levels is sent to the link connection controller 36. When a base station or relay station is identified, the link connection controller 36 commands the connection request signal generator 37 to send a request for connection to the identified base station or relay station.

The connection request signal generator 37 produces and sends a connection request signal to the base station or relay station. Suppose, for example, that the mobile station 30 detects a relay station while receiving an MBSFN transmission (MBMS data) from the base station 43a. The mobile station 30 then sends a connection request signal to the detected relay station, so that MBMS data can also be received from that station. The terminal group setup information extractor 38 extracts group information from the received signal, thus recognizing a group identifier indicating to which group the mobile station 30 belongs.

The mobile station 30 also transmits signals containing data from a data processor (not illustrated), link quality data from the link quality data transmitter 34, or a connection request signal from the connection request signal generator 37. These signals are directed to the coder-modulator 32-2 for coding and modulation, and the resulting radio signal is transmitted from the antenna a4 via the radio unit 31-2. This uplink transmission may be performed by using OFDM, or alternatively, single-carrier frequency-division multiple access (SC-FDMA) techniques.

Figure 15:
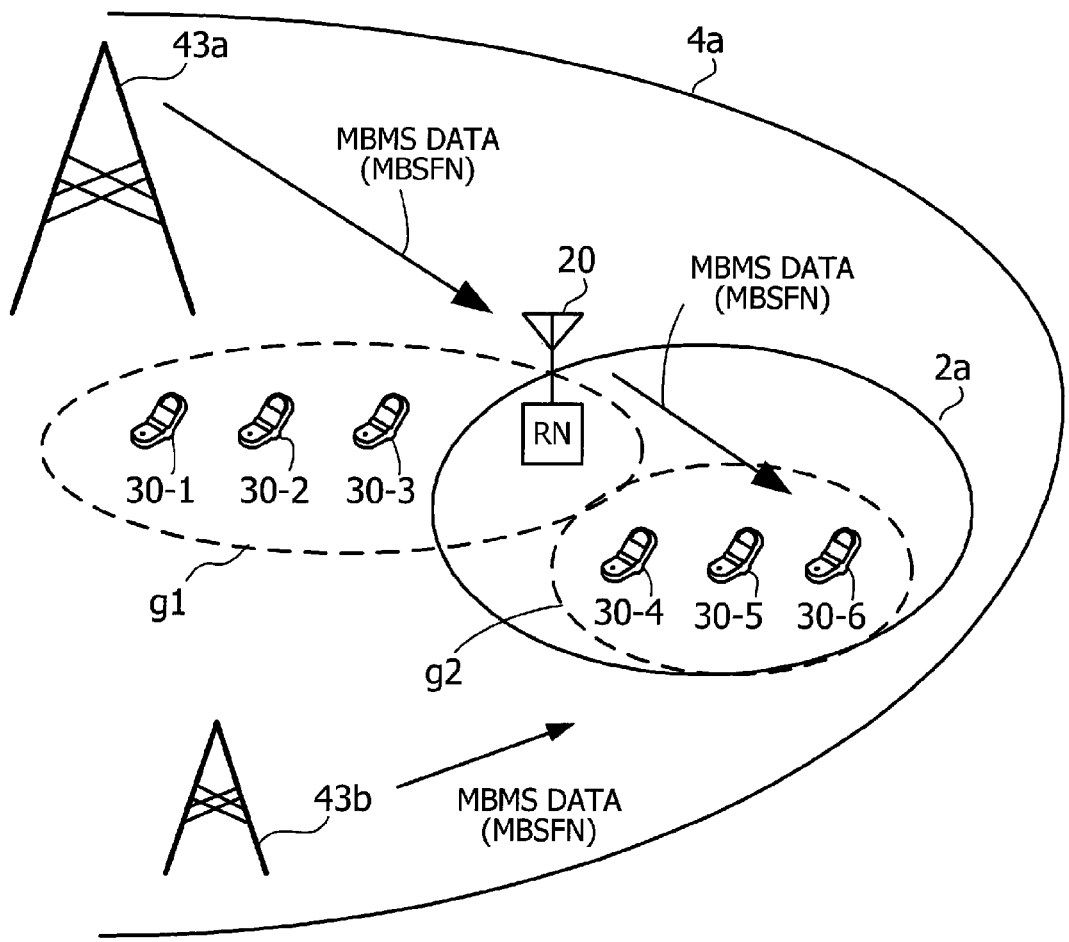
FIG. 15 illustrates a structure of a radio communications system.

A wireless system with grouping functions for radio communication will be described below. FIG. 15 illustrates a structure of a radio communications system. The illustrated radio communications system 1a-1 according to the first embodiment includes base stations 43a and 43b, a relay station 20, and mobile stations 30-1 to 30-6. (While not depicted in this and subsequent system block diagrams, the system may also include an MBMS control apparatus 41 and an MBMS data storage apparatus 42).

The base station 43a makes a cell 4a, in which the base station 43b, relay station 20, and mobile stations 30-1 to 30-6 are located. Three mobile stations 30-4 to 30-6 are in the relay area 2a of the relay station 20. The base station 43b also accommodates those mobile stations 30-4 to 30-6 in its service coverage. (It is noted that the base station 43b may not necessarily be located in the cell 4a, as opposed to FIG. 15, as long as those mobile stations 30-4 to 30-6 are in the service area of the base station 43b.)

The base station 43a puts the relay station 20 and mobile stations 30-1 to 30-3 into group g1, and the mobile stations 30-4 to 30-6 into group g2. Transmission from the base station 43a to group g1 may correspond to the foregoing first MBSFN transmission. Transmission from the relay station 20 to group g2 may correspond to the foregoing second MBSFN transmission.

The base station 43a executes MBSFN transmission (i.e., transmitting MBMS data based on the communication format of MBSFN) to group g1. In response, the relay station 20 relays this MBSFN transmission to group g2 by executing a series of relaying operations such as demodulation, decoding, coding, and modulation to forward the data.

The base station 43b sends MBMS data of MBSFN to group g2 on the basis of transmission timing t1 at which the relay station 20 relays the MBMS data. Further, the base station 43a retransmits to group g2 the same MBMS data as the original MBMS data with an MBSFN format (third MBSFN transmission), similarly on the basis of transmission timing t1 at which the relay station 20 relays the MBMS data. As a result, the same MBMS data is transmitted from the relay station 20 and base stations 43a and 43b at transmission timing t1. Accordingly the mobile stations 30-4 to 30-6 in group g2 receive each MBMS data transmitted from the relay station 20 and base stations 43a and 43b.

Figure 16:
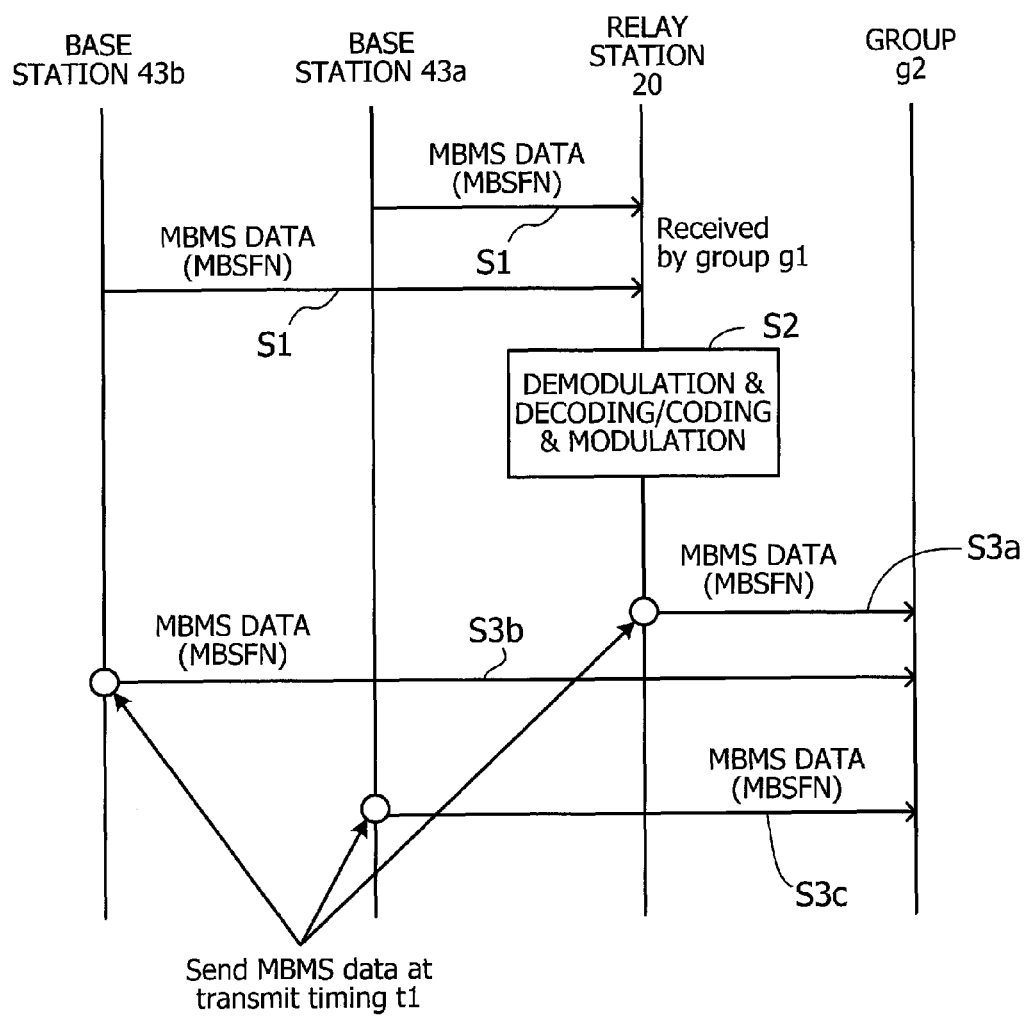
FIG. 16 illustrates an operation sequence of the radio communications system.

FIG. 16 illustrates an operation sequence of the radio communications system 1a-1.

(S1) The base stations 43a and 43b transmit MBMS data to group g1 with an MBSFN format.

(S2) After the MBMS data reception, the relay station 20 performs a series of relaying operations such as demodulation, decoding, coding, and modulation to relay the data.

(S3a) At transmission timing t1, the relay station 20 transmits the MBMS data to group g2 with an MBSFN format.

(S3b) At transmission timing t1, in synchronization with the MBMS data from the relay station 20, the base station 43b also transmits the MBMS data with an MBSFN format.

(S3c) At transmission timing t1, in synchronization with the MBMS data from the relay station 20, the base station 43a retransmits the MBMS data with an MBSFN format.

As can be seen from the above explanation, the radio communications system 1a-1 is configured to perform MBSFN transmission from the base stations 43a and 43b in synchronization with MBSFN transmission from the relay station 20 to group g2 at transmission timing t1. This feature makes it possible to transmit the same MBMS data signals during the period of transmission timing t1, as opposed to sending different data over the same radio resource, and thus prevents degradation of the quality of data transmission.

The relay station 20 transmits MBMS data in its MBSFN relay transmission, and at the same time, the base stations 43a and 43b transmit the same MBMS data in their MBSFN transmission. The mobile stations 30-4 to 30-6 in group g2 can receive and combine those multiple transmissions to improve the performance characteristics of transmission.

Figure 17:
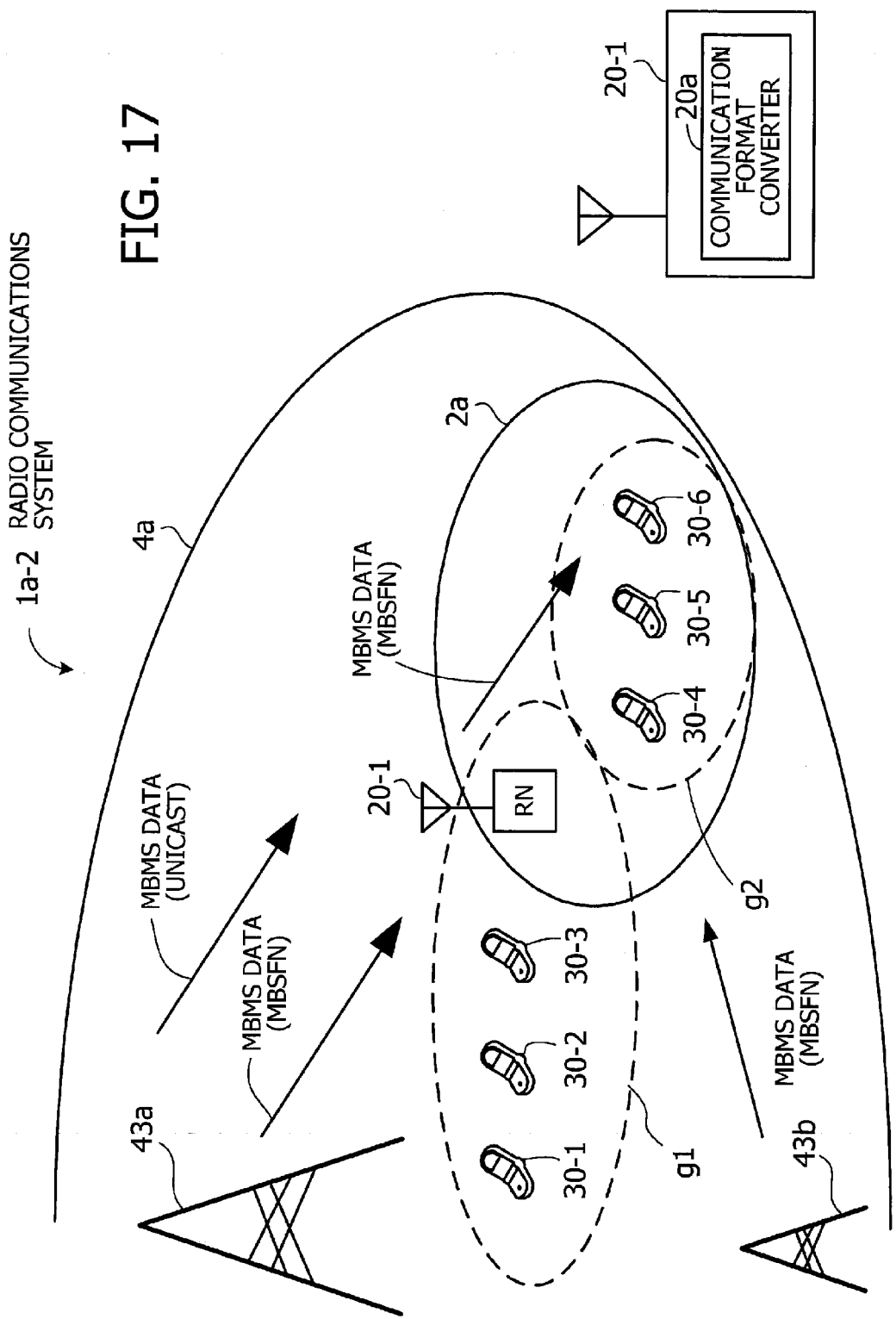
FIG. 17 illustrates a structure of a radio communications system.

A radio communication system according to a second embodiment will now be explained below. FIG. 17 illustrates a structure of a radio communications system. The illustrated radio communications system 1a-2 according to the second embodiment includes base stations 43a and 43b, a relay station 20-1, and mobile stations 30-1 to 30-6. The basic structure of this radio communications system 1a-2 is similar to what have been discussed above in FIG. 15. The radio communications system 1a-2 is, however, different in that the relay station 20-1 includes a communication format converter 20a.

The base station 43a sends MBMS data two times. In the first data transmission, the base station 43a sends MBMS data with a first communication format (e.g., unicast communication). In the second data transmission, the base station 43a sends the same with a second communication format (e.g., MBSFN) as in the foregoing third MBSFN transmission.

Here the base station 43a executes MBMS data transmission to group g1 with unicast communication. In response, the relay station 20-1 produces MBMS data with an MBSFN transmission format by converting communication formats from unicast to MBSFN after performing demodulation and decoding of the data.

The coded, modulated and converted MBMS data is transmitted to group g2 with an MBSFN format. The conversion from unicast to MBSFN involves replacement of normal CP with extended CP, and changing radio channels from PDSCH channels to PMCH channels. For example, the transmit radio unit 25b-2 discussed in FIG. 13 may be modified to implement this conversion of communication formats (replacement of CP).

The base station 43b, on the other hand, transmits MBMS data to group g2 with an MBSFN format, on the basis of transmission timing t1 at which the relay station 20-1 relays the MBMS data.

Further, the base station 43a transmits the same MBMS data to group g2 now with an MBSFN format, similarly on the basis of transmission timing t1 at which the relay station 20-1 relays the MBMS data. That is, MBMS data is transmitted from the relay station 20-1 and base stations 43a and 43b at transmission timing t1. The mobile stations 30-4 to 30-6 in group g2 thus receive the MBMS data from the relay station 20-1 and base stations 43a and 43b.

Figure 18:
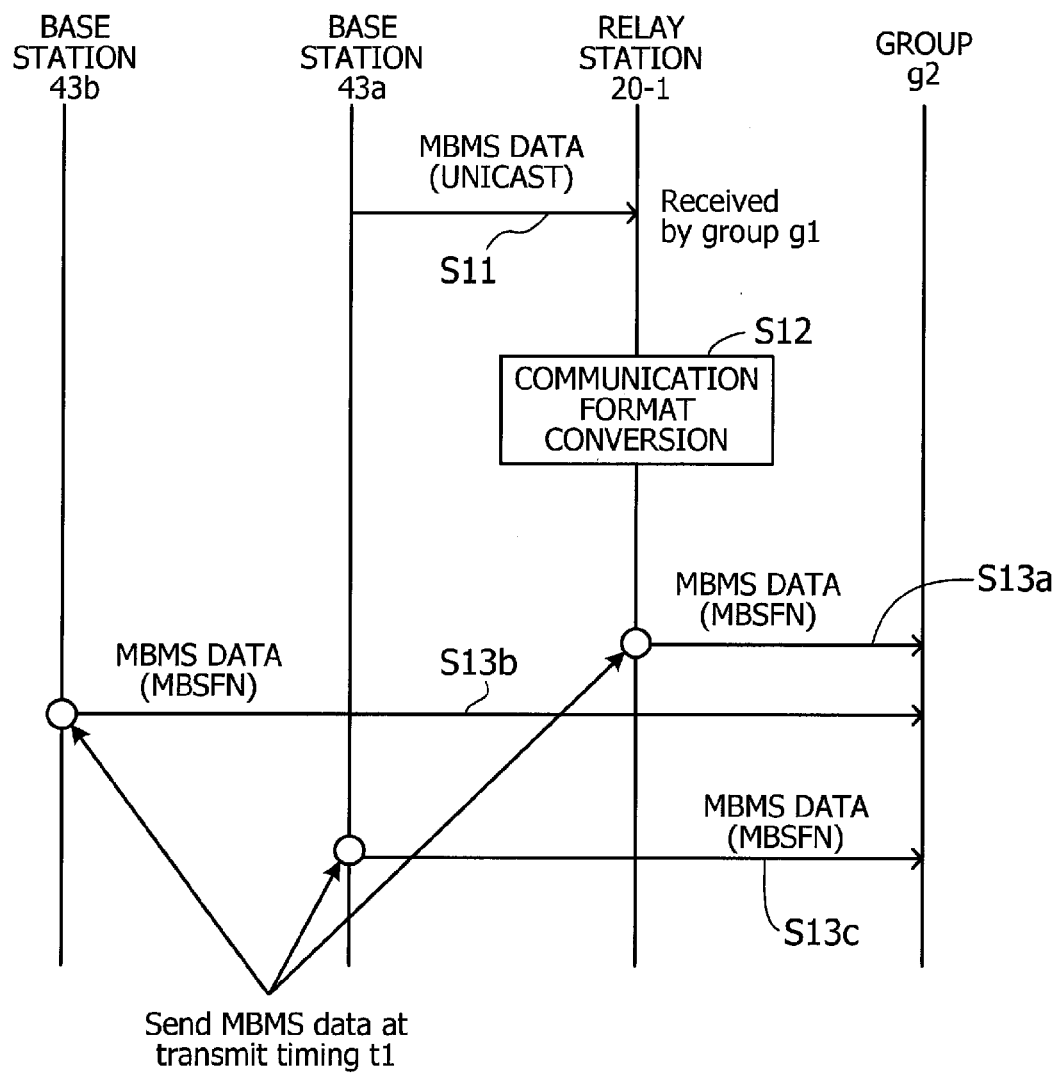
FIG. 18 illustrates an operation sequence of the radio communications system.

FIG. 18 illustrates an operation sequence of the radio communications system 1a-2.

(S11) The base station 43a sends MBMS data to group g1 in the form of unicast communication.

(S12) Upon receipt of the MBMS data, the relay station 20-1 converts communication formats from unicast to MBSFN, in addition to executing a series of relaying operations such as demodulation, decoding, coding, and modulation to relay the data.

(S13a) At transmission timing t1, the relay station 20-1 transmits the MBMS data to group g2 with an MBSFN format.

(S13b) Similarly at transmission timing t1, in synchronization with the MBMS data from the relay station 20-1, the base station 43b transmits the MBMS data with an MBSFN format.

(S13c) At transmission timing t1, in synchronization with the MBMS data from the relay station 20-1, the base station 43a transmits again the same MBMS data with an MBSFN format.

As can be seen from the above explanation, the radio communications system 1a-2 is configured such that the base station 43a first performs unicast transmission of MBMS data, and the relay station 20-1 then converts communication formats from unicast to MBSFN to perform MBSFN transmission of the MBMS data. Here the MBSFN transmission from the relay station 20-1 to group g2 is conducted in synchronization with that from the base stations 43a and 43b.

This feature makes it possible to improve the transmission quality without producing interference in group g2. Also, the same MBMS data is transmitted at the same time from the relay station 20-1 in its MBSFN relay transmission and from the base stations 43a and 43b in their MBSFN transmission. The mobile station 30-4 to 30-6 in group g2 can receive and combine multiple transmissions from those stations, thus improving the characteristics of transmission.

Figure 19:
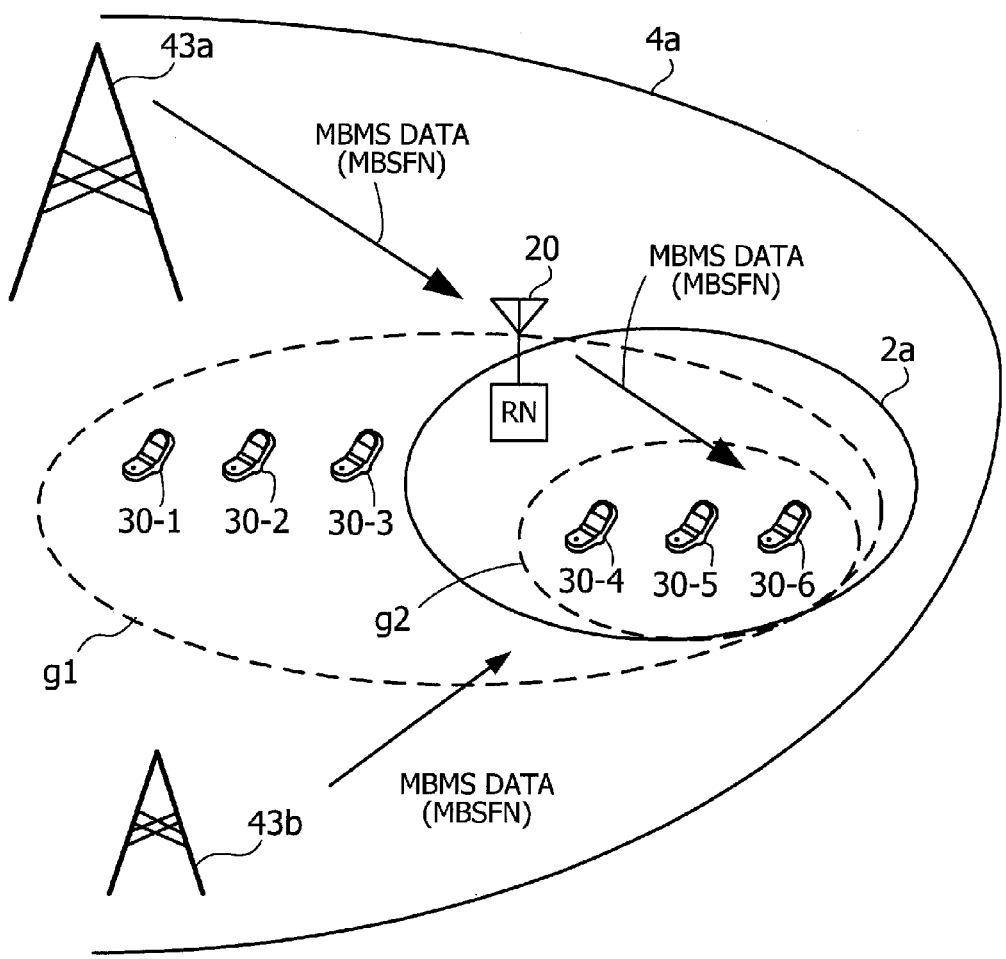
FIG. 19 illustrates a structure of a radio communications system.

A radio communication system according to a third embodiment will now be explained below. FIG. 19 illustrates a structure of a radio communications system. The illustrated radio communications system 1a-3 according to the third embodiment includes base stations 43a and 43b, a relay station 20, and mobile stations 30-1 to 30-6. The basic structure of this radio communications system 1a-3 is similar to what have been discussed in FIG. 15, except for the way of grouping mobile stations.

The base station 43a makes a cell 4a, in which the base station 43b, relay station 20, and mobile stations 30-1 to 30-6 are located. Three mobile stations 30-4 to 30-6 are in the relay area 2a of the relay station 20. The base station 43a sets up a group that performs MBSFN reception, and another group that performs MBSFN reception via the relay station 20.

Referring to the example illustrated in FIG. 19, the relay station 20 and mobile stations 30-1 to 30-6 perform MBSFN reception, thus forming a group g1. On the other hand, mobile stations 30-4 to 30-6 perform MBSFN reception via the relay station 20, thus forming another group g2.

Here the base station 43a executes MBSFN transmission to group g1. In response, the relay station 20 relays this MBSFN transmission to group g2 by executing a series of relaying operations such as demodulation, decoding, coding, and modulation.

The base station 43b, on the other hand, performs MBSFN transmission to group g2 on the basis of transmission timing t1 at which the relay station 20 relays the MBMS data. Further, the base station 43a executes MBSFN transmission again to group g1, on the basis of transmission timing t1 at which the relay station 20 relays the MBMS data. This operation makes it possible for the mobile stations 30-4 to 30-6 in group g2 to receive two MBSFN transmissions from the base station 43a since those mobile stations also belong to group g1.

Figure 20:
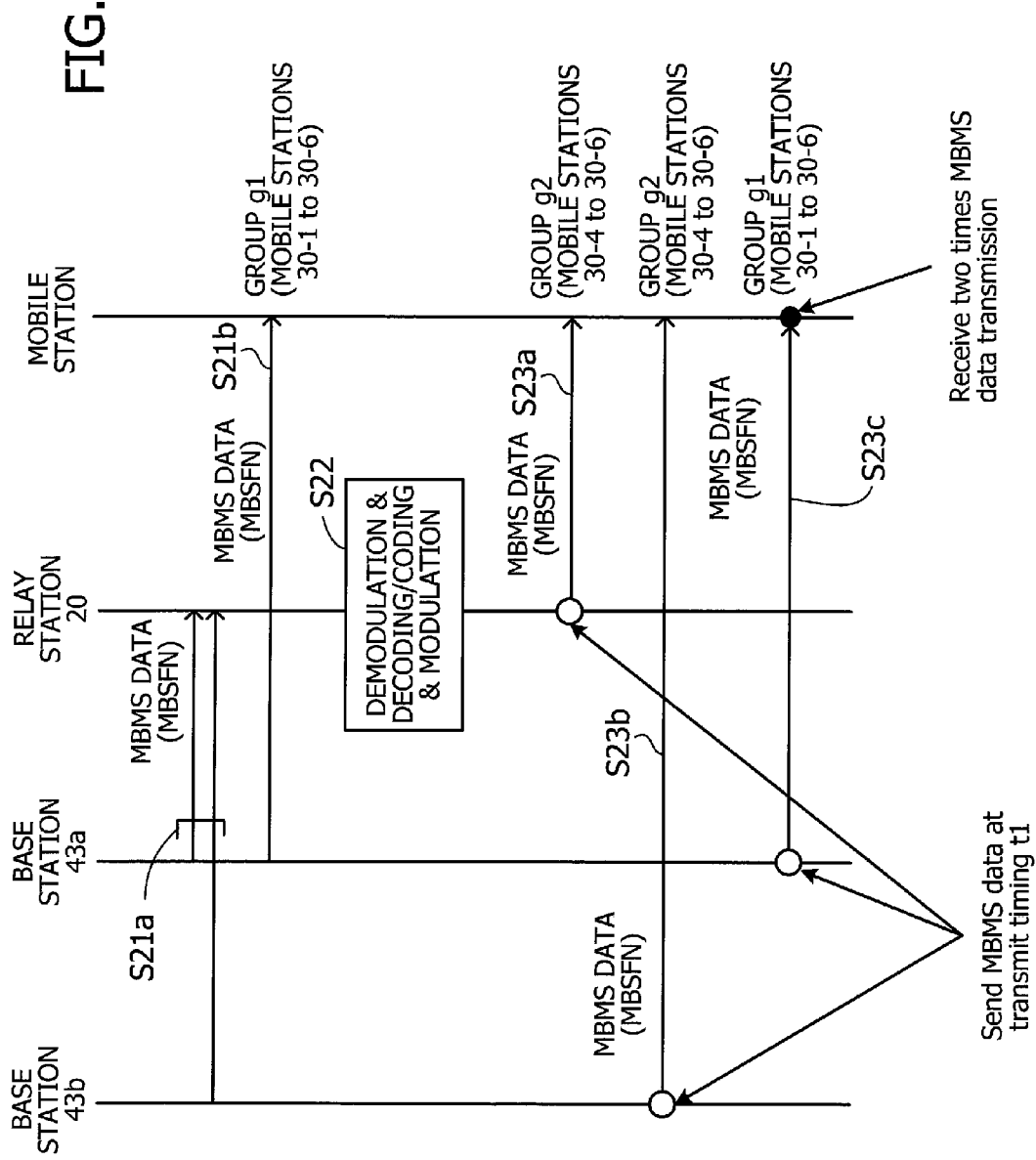
FIG. 20 illustrates an operation sequence of the radio communications system.

FIG. 20 illustrates an operation sequence of the radio communications system 1a-3.

(S21a) The base stations 43a and 43b send MBMS data to group g1. The MBMS data reaches the relay station 20 in group g1.

(S21b) The MBMS data transmitted with an MBSFN format at step S21a reaches mobile stations 30-1 to 30-6 in group g1.

(S22) After the MBMS data reception, the relay station 20 performs a series of relaying operations such as demodulation, decoding, coding, and modulation to relay the data.

(S23a) At transmission timing t1, the relay station 20 transmits the MBMS data to group g2 (i.e., mobile stations 30-4 to 30-6) with an MBSFN format.

(S23b) At transmission timing t1, in synchronization with the MBMS data from the relay station 20, the base station 43b transmits the MBMS data to group g2 with an MBSFN format.

(S23c) At transmission timing t1, in synchronization with the MBMS data from the relay station 20, the base station 43a transmits the MBMS data again to group g1 with an MBSFN format. Accordingly, the mobile stations 30-4 to 30-6 can receive two sets of MBMS data from the base station 43a because they belong to both groups g1 and g2, thus making it possible to enhance the effect of time diversity.

As can be seen from the above explanation, the radio communications system 1a-3 includes group g1 that performs MBSFN reception and group g2 that performs MBSFN reception via a relay station 20, so that MBSFN transmission from the relay station 20 to group g2 can be conducted at the same time as that from the base stations 43a and 43b.

This feature makes it possible to improve the transmission quality for group g2. Also, the base station 43a relays the same MBSFN transmission to group g1, in synchronization with MBSFN relay transmission from the relay station 20. The mobile stations 30-4 to 30-6 that belong to both groups g1 and g2 can combine both transmissions, thus improving the performance characteristics of transmission.

A method of forming groups will be described below. When, for example, the proposed techniques are used in an LTE system or LTE-Advanced system, the stations are classified into groups on the basis of whether their MBSFN reception is via or not via a relay station. Different groups are then given different RNTIs. Those RNTIs and group information are provided to mobile stations in the form of control signals, thus permitting the mobile stations to receive MBSFN transmissions according to their groups.

Groups are set up by a relay station, base station, or MBMS control apparatus 41. Mobile stations receive an identifier (ID) of their group, together with the information on that group. The management of such information is also performed by a relay station, base station, or MBMS control device.

Referring now to the example structure illustrated in FIG. 15, the following section will describe how the base station 43a sets up such groups. The base station 43a receives a connection request from the relay station 20 during the course of radio link setup as part of deployment of the relay station 20. The reception of this connection request permits the base station 43a to identify the relay station 20 in its cell 4a. In a similar way, the base station 43a also identifies mobile stations 30-1 to 30-3 in its cell 4a. The base station 43a gives an ID (e.g., RNTI) to each identified relay station 20 and mobile station 30-1 to 30-3 and sets up group g1 by using those RNTIs.

The base station 43a may also receive a connection request via the relay station 20. In this case, the base station 43a identifies mobile stations 30-4 to 30-6 in the relay area 2a of the relay station 20 and gives them RNTIs in the relay area 2a. Then the base station 43a produces group g2 from mobile stations 30-4 to 30-6 that use the relay station 20 to communicate with the base station 43a.

The base station 43a manages which RNTI belongs to which group. It is noted that the relay station 20 knows what RNTIs have been given to mobile stations 30-4 to 30-6 that use the relay station 20 to communicate with the base station 43a. The relay station 20 may therefore be configured to set up group g2 and notify the base station 43a of the setup result. Also, one mobile station may belong to plurality of groups. In that case, the mobile station is to be informed that the mobile station may receive as many transmissions as the number of groups to which the mobile station belongs.

The above description has assumed that the cell 4a of the base station 43a has the same cell ID as the cell (relay area) 2a of the relay station 20 situated in the cell 4a. It is also possible, however, that the two cells 4a and 2a have different cell IDs and control their links independently.

In this alternative case, the relay station 20 assigns an RNTI to a mobile station when a connection request is received from that station. The relay station 20 then notifies the base station 43a of the RNTI assigned to the mobile station. In response to this notification, the base station 43a sets up and manages a group of mobile stations that use the relay station 20 to communicate with the base station 43a.

In the above-described case, those mobile stations 30-4 to 30-6 receive MBSFN transmissions via the relay station 20. The base station 43a also joins this transmission of MBMS data, but its receive signal condition may not be good enough for all the mobile stations 30-4 to 30-6 to receive the MBMS data properly.

Some of those mobile stations may, however, be able to receive MBMS data of the MBSFN transmission from the base station 43a. In that case, such mobile stations (e.g., mobile stations 30-4 to 30-6) are allowed to belong not only to group g2, but also to group g1 as in the third embodiment discussed above.

The mobile stations 30-4 to 30-6 are then notified of the fact that they belong to plurality of groups. The base station 43a performs the third MBSFN transmission to transmit the same MBMS data, in addition to the first MBSFN transmission, thus enabling the mobile stations 30-4 to 30-6 to receive the same MBSFN data multiple times. This multiple reception allows the mobile stations to take advantage of time diversity reception and thus improves their receive signal condition.

While the above description has assumed that groups are set up by base stations, the MBMS control apparatus 41 may take that role and provide the resultant group information and other information to base stations, relay stations, and mobile stations.

Figure 21:
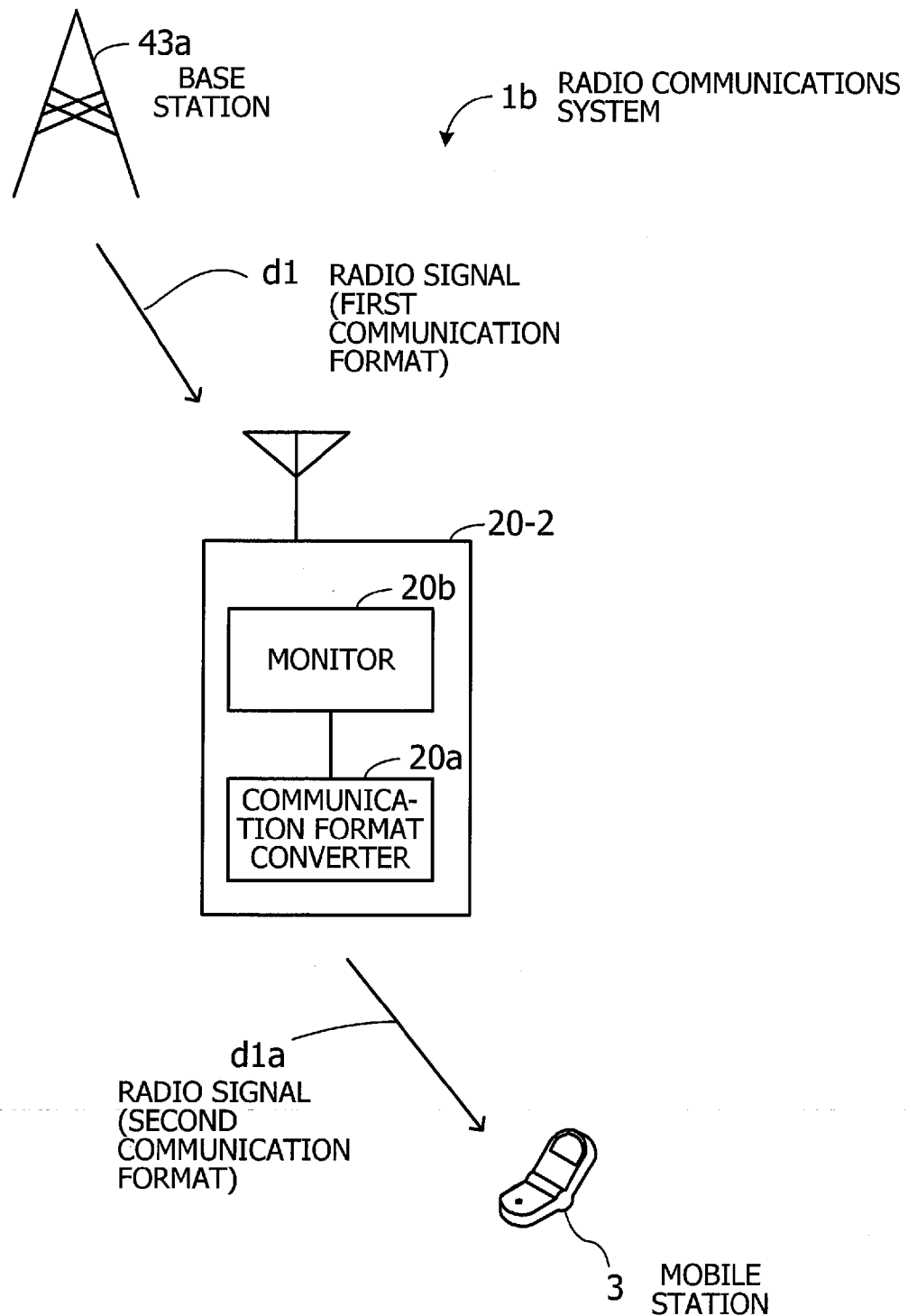
FIG. 21 illustrates a structure of a radio communications system.

The above-described radio communication system may have some variations. A first variation is a radio communications system in which the communication format is converted depending on the number of mobile stations under the coverage of a relay station 20. FIG. 21 illustrates a structure of such a radio communications system. This radio communications system 1b includes a base station 43a, a relay station 20-2, and mobile stations 3.

The base station 43a transmits a radio signal d1 having a first communication format. The relay station 20-2 includes a communication format converter 20a and a monitor 20b. The monitor 20b monitors the number of mobile stations under the control of the relay station 20-2. Based on the monitoring result, the communication format converter 20a converts the first communication format to another format when relaying the signal.

Specifically, when the number of mobile stations 3 falls below a given threshold, the monitor 20b so notifies the communication format converter 20a. In response, the communication format converter 20a converts the first communication format to a second communication format, to relay the received radio signal as a new radio signal d1a in the second communication format.

Suppose, for example, that the first communication format is MBSFN, and the second communication format is unicast. Mobile stations 3 receive MBMS data in MBSFN communication. When the number of such mobile stations falls below a threshold, the relay station 20-2 converts the received MBMS data from MBSFN format to unicast format, thus relaying the MBMS data in unicast form.

The fact that the number of mobile stations 3 has fallen below a threshold means that only a few mobile stations are receiving MBSFN transmissions, which justifies switching to the unicast format with a normal CP to send MBMS data. This makes effective use of radio resources possible since it is no longer necessary to transmit MBMS data multiple times.

Figure 22:
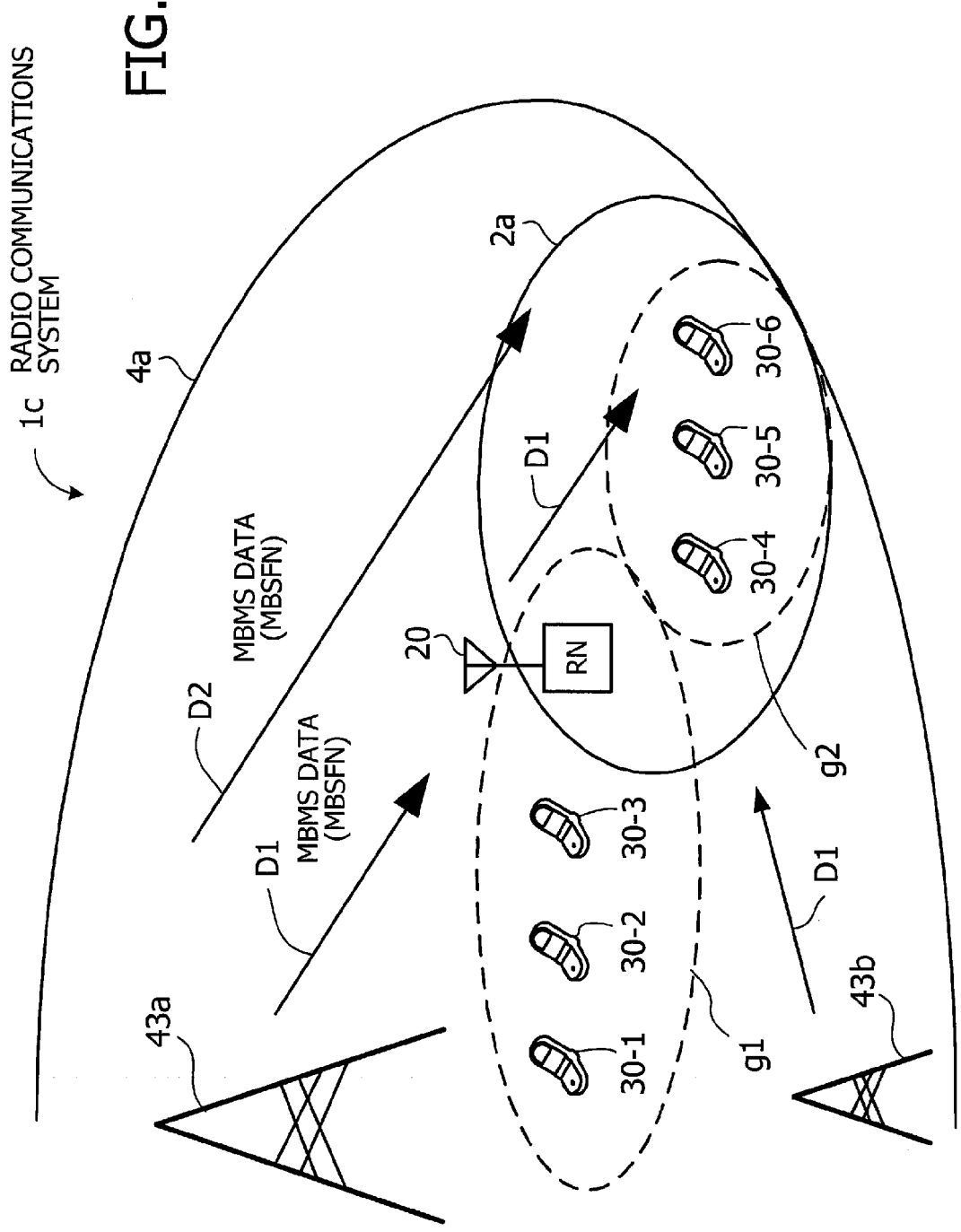
FIG. 22 illustrates a structure of a radio communications system.

A second variation is a radio communications system in which the first MBSFN transmission and third MBSFN transmission are configured to send different MBMS. FIG. 22 illustrates a structure of such a radio communications system. This radio communications system 1c includes base stations 43a and 43b, a relay station 20, and mobile stations 30-1 to 30-6.

The base station 43a makes a cell 4a, in which the base station 43b, relay station 20, and mobile stations 30-1 to 30-6 are located. Three mobile stations 30-4 to 30-6 are visiting the relay area 2a of the relay station 20. The base station 43a combines the relay station 20 and mobile stations 30-1 to 30-3 into one group g1, and the mobile stations 30-4 to 30-6 into another group g2.

In the foregoing system of FIG. 15, the third MBSFN transmission is supposed to send the same MBMS data of the first MBSFN transmission. In contrast, the radio communications system 1c is configured to send MBMS data with different content in the two transmissions.

MBMS data is scrambled by using different codes for different MBSFNs, meaning that it is possible to distinguish one MBSFN transmission from others. Further, different transmit slots use different scrambling codes, meaning that MBSFN data transmitted at different timings can be distinguished from one another. It is thus possible to distinguish the first MBSFN transmission from the third MBSFN transmission even if they carry different MBMS data.

The base station 43a now executes MBSFN transmission to group g1 by transmitting MBMS data D1 with an MBSFN format. In response, the relay station 20 relays this MBSFN transmission to group g2 by executing a series of relaying operations such as demodulation, decoding, coding, and modulation.

The base station 43b also transmits MBMS data D1 to group g2 with an MBSFN format, on the basis of transmission timing t1 at which the relay station 20 relays the MBMS data D1.

Further, the base station 43a transmits MBMS data D2 to group g2 with an MBSFN format, on the basis of transmission timing t1 at which the relay station 20 relays MBMS data D1. MBMS data D2 is different from the preceding MBMS data D1.

The mobile stations 30-4 to 30-6 in group g2 thus receive MBMS data D1 from the base station 43b and relay station 20, as well as MBMS data D2 from the base station 43. Data is distinguishable in this configuration of the system for the above-described reasons.

A third variation is as follows. The foregoing first embodiment implements first and second MBSFN transmissions. The third variation executes those transmissions in separate MBSFN areas. Specifically, the first MBSFN transmission takes place in a first MBSFN area, while the second MBSFN transmission takes place in a second MBSFN area. Those two MBSFN transmissions use different scrambling codes, making it possible to achieve the same effect of the first embodiment. Information about MBSFN areas is previously sent from base stations and relay stations to mobile stations. When transmitting data, mobile stations produce scrambling codes in accordance with the received MBSFN area number. Data can be received and descrambled by using those codes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. A radio communications system comprising:
a first radio base station to convert multimedia broadcast multicast service (MBMS) data to unicast data and transmit the unicast data to an intermediate station;
the intermediate station to receive the unicast data from the first radio base station and convert the unicast data to the MBMS data and broadcast the converted MBMS data to a mobile station;
a second radio base station; and
the mobile station to receive the same MBMS data from the first radio base station via the intermediate station and the second radio base station in the same period;
wherein the second radio base station comprises a transmitter to broadcast the MBMS data that is the same as the MBMS data converted in advance by the intermediate station, at the same time when the intermediate station broadcasting the converted MBMS data to the mobile station by using same radio resource that the intermediate station uses in the broadcasting of the converted MBMS data.

2. The radio communications system according to claim 1, wherein the first radio base station also transmits the MBMS data that is the same as the MBMS data to be broadcasted by the intermediate station, in synchronization with the broadcasting by the intermediate station and by using a radio resource that the intermediate station uses in the broadcasting of the received MBMS data.

3. A radio communications system comprising:
a first radio base station to convert multimedia broadcast multicast service (MBMS) data to unicast data and transmit the unicast data to an intermediate station;

the intermediate station to receive the unicast data from the first radio base station and convert the unicast data to the MBMS data and broadcast the converted MBMS data to a mobile station;

a second radio base station; and the mobile station to receive the same MBMS data from the first radio base station via the intermediate station and the second radio base station in the same period;

wherein the first radio base station classifies subordinate stations into groups, and wherein the second radio base station comprises a transmitter that broadcasts, to one of the groups that is to receive the MBMS data from the intermediate station, the MBMS data that is the same as the MBMS data converted in advance by the intermediate station, at the same time when the intermediate station broadcasting the converted MBMS data to the mobile station by using same radio resource that the intermediate station uses in the broadcasting of the converted MBMS data.

4. The radio communications system according to claim 3, wherein the first radio base station transmits, to the one of the groups, the MBMS data that is the same as the MBMS data to be broadcasted by the intermediate station, in synchronization with the broadcasting by the intermediate station and by using the radio resource that the intermediate station uses in the broadcasting of the received MBMS data.

5. The radio communications system according to claim 3, wherein:

the first radio base station classifies the stations into two groups, one group being formed from the intermediate station and mobile stations that do not use the intermediate station to perform radio communication, the other group being formed from mobile stations that use the intermediate station to perform radio communication;

the intermediate station broadcasts the MBMS data to the other group;

the second radio base station broadcasts, to the other group, the MBMS data that is the same as the MBMS data to be broadcasted by the intermediate station, in synchronization with the broadcasting by the intermediate station and by using the radio resource that the intermediate station uses in the broadcasting of the received MBMS data; and the first radio base station transmits, to the other group, the MBMS data that is the same as the MBMS data to be broadcasted by the intermediate station, in synchronization with the broadcasting by the intermediate station and by using the radio resource that the intermediate station uses in the broadcasting of the received MBMS data.

6. A radio communications system comprising:

a first radio base station;

an intermediate station to receive data from the first radio base station and relay data to a mobile station;

a second radio base station; and the mobile station to receive the same data from the first base station via the intermediate station and the second radio base station in the same period;

wherein:

the first radio base station converts unicast data to multimedia broadcast multicast service (MBMS) data and transmit the MBMS data;

the intermediate station receives the MBMS data, converts the received MBMS data from the MBMS format to a unicast format, and relays the received data in the unicast format; and the second radio base station comprises a transmitter that transmits, using the unicast format, the data that is the same as the data converted in advance by the intermediate station, at the same time when the intermediate station transmitting the converted unicast data to the mobile station by using the same radio resource that the intermediate station uses in the transmission of the converted unicast data.

7. The radio communications system according to claim 6, wherein the first radio base station also transmits data that is in the unicast format and the same as the data to be relayed by the intermediate station, in synchronization with the relaying by the intermediate station and by using the radio resource that the intermediate station uses in the relaying of the received data.

8. The radio communications system according to claim 6, wherein:

the first radio base station classifies the stations into first and second groups, the first group being formed from the intermediate station and mobile stations that do not use the intermediate station to perform radio communication, the second group being formed from mobile stations that use the intermediate station to perform radio communications;

the first radio base station transmits the data to the first group in the multicast or broadcast format;

the intermediate station receives the data, converts the received data from the multicast or broadcast format to the unicast format, and transmits the received data to the second group in the unicast format;

the second radio base station transmits, to the second group, data that is in the unicast format and the same as the data to be relayed by the intermediate station, in synchronization with the relaying by the intermediate station and by using the radio resource that the intermediate station uses in the relaying of the received data; and the first radio base station transmits, to the second group, data that is in the unicast format and the same as the data to be relayed by the intermediate station, in synchronization with the relaying by the intermediate station and by using the radio resource that the intermediate station uses in the relaying of the received data.

9. A radio communication method comprising:

converting, by a first radio station, unicast data to multimedia broadcast multicast service (MBMS) data and transmitting the MBMS data to an intermediate station;

receiving, by the intermediate station, the MBMS data;

converting, by the intermediate station, covering a dead spot of the first radio base station the received data from the MBMS format to a unicast format, and transmitting the received data in the unicast format;

transmitting, by a second radio base station, data that is the same as the data converted in advance by the intermediate station, at the same time when the intermediate station transmitting the converted unicast data to the mobile station by using the same unicast format; and receiving, by a mobile station, the same data from the first base station via the intermediate station and the second radio base station in the same period.

10. The radio communication method according to claim 9, further comprising transmitting, by the first radio base station, data that is in the unicast format and the same as the data to be relayed by the intermediate station, in synchronization with the relaying by the intermediate station and by using the radio resource that the intermediate station uses in the relaying of the received data.

11. The radio communication method according to claim 9, further comprising:
classifying, by the first radio base station, stations into first and second groups, the first group being formed from the intermediate station and mobile stations that do not use the intermediate station to perform radio communication, the second group being formed from mobile stations that use the intermediate station to perform radio communications;
transmitting, from the first radio base station to the first group, the data in the multicast or broadcast format; and
transmitting, from the first radio base station to the second group, data that is in the unicast format and the same as the data to be relayed by the intermediate station, in synchronization with the relaying by the intermediate station and by using the radio resource that the intermediate station uses in the relaying of the received data; and
wherein:
the converting by the intermediate station converts the received data from the multicast or broadcast format to the unicast format, and transmits the received data to the second group in the unicast format; and
the transmitting by the second radio base station transmits, to the second group, data that is in the unicast format and the same as the data to be relayed by the intermediate station, in synchronization with the relaying by the intermediate station and by using the radio resource that the intermediate station uses in the relaying of the received data.

12. A radio communications system comprising:
a first radio base station to convert multimedia broadcast multicast service (MBMS) data to unicast data and transmit the unicast data to an intermediate station;
the intermediate station to receive the unicast data from the first radio base station and convert the unicast data to the MBMS data and broadcast the converted MBMS data; and
a second radio base station;
wherein:
the first radio base station classifies stations into first and second groups, the first group being formed from the intermediate station and mobile stations that are to receive the unicast data directly from the first radio base station, the second group being formed from mobile stations that are to receive the converted MBMS data via the intermediate station;
the first radio base station transmits the unicast data to the first group;
the intermediate station receives the unicast data, executes converting operations on the received unicast data, and broadcasts the converted MBMS data to the second group;
the second radio base station comprises a transmitter that broadcasts the MBMS data that is the same as the MBMS data converted in advance by the intermediate station, at the same time when the intermediate station broadcasting the converted MBMS data to the mobile station by using same radio resource that the intermediate station uses in the broadcasting of the converted MBMS data; and
the mobile stations in the second group receive the same MBMS data from the first base station via the intermediate station and the second radio base station in the same period.

13. The radio communications system according to claim 12, wherein the first radio base station transmits, to the first group, the MBMS data that is the same as the MBMS data to be broadcasted by the intermediate station, in synchronization with the broadcasting by the intermediate station and by using the radio resource that the intermediate station uses in the broadcasting of the resulting MBMS data.

14. A radio communication method comprising:
deploying a base station that transmits a radio signal having a multimedia broadcast multicast service (MBMS) format;
deploying an intermediate station including a monitoring unit that monitors a number of mobile stations which receive the radio signal in the MBMS format under control of the intermediate station, and a communication format converter that performs conversion of the MBMS format before relaying the radio signal, depending on a result of the monitoring; and
performing, by the communication format converter, conversion from the MBMS format to a unicast format so that the radio signal is relayed in the unicast format when the monitoring unit determines that the number of mobile stations falls below a threshold;
wherein the MBMS format includes a first cyclic prefix and the unicast format includes a second cyclic prefix different from length of the first cyclic prefix of the MBMS format.

* * * * *